(12) United States Patent
Oki

(10) Patent No.: US 8,599,438 B2
(45) Date of Patent: Dec. 3, 2013

(54) IMAGE FORMING APPARATUS

(75) Inventor: Makoto Oki, Hino (JP)

(73) Assignee: Konica Minolta Business Technologies, Inc. (JP)

( * ) Notice: Subject to any disclaimer, the term of this patent is extended or adjusted under 35 U.S.C. 154(b) by 984 days.

(21) Appl. No.: 12/692,844

(22) Filed: Jan. 25, 2010

(65) Prior Publication Data
US 2010/0195163 A1 Aug. 5, 2010

(30) Foreign Application Priority Data

Jan. 30, 2009 (JP) ................................. 2009-020081
Mar. 26, 2009 (JP) ................................. 2009-076549

(51) Int. Cl.
*G06F 15/00* (2006.01)
*G03F 3/08* (2006.01)
*H04N 1/46* (2006.01)

(52) U.S. Cl.
USPC ............. 358/3.23; 358/1.6; 358/1.9; 358/518

(58) Field of Classification Search
USPC .......... 358/1.9, 1.6, 1.15, 500, 515, 518, 530, 358/3.23
See application file for complete search history.

(56) References Cited

U.S. PATENT DOCUMENTS

| | | | |
|---|---|---|---|
| 7,646,509 B1* | 1/2010 | Nagarajan et al. | 358/1.9 |
| 2007/0131010 A1* | 6/2007 | Binder et al. | 71/23 |
| 2007/0208938 A1* | 9/2007 | Hosoda | 713/168 |
| 2010/0028029 A1* | 2/2010 | Yokoyama | 399/39 |
| 2010/0128309 A1* | 5/2010 | Matoba | 358/1.15 |

FOREIGN PATENT DOCUMENTS

JP 2004-258397 A 9/2004

* cited by examiner

*Primary Examiner* — Jerome Grant, II
(74) *Attorney, Agent, or Firm* — Cantor Colburn LLP

(57) ABSTRACT

Disclosed is an image forming apparatus including an image forming unit which forms a toner image on an image carrier and transfers the formed toner image on a paper, a color conversion process unit to carry out a color conversion process to convert inputted image data to image data of an output color in the image forming unit, a paper type information obtaining unit to obtain at least one or more information among a size of a paper, a basis weight of the paper and whether the paper is coated or not and a control unit to control so as to change a maximum adhesion amount of a toner to a paper by selecting a color conversion process condition for the color conversion process unit based on the information obtained by the paper type information obtaining unit.

4 Claims, 22 Drawing Sheets

| PAPER FEEDING TRAY | SIZE | BASIS WEIGHT | COATED OR NOT |
|---|---|---|---|
| 41 | ... | ... | ... |
| 42 | ... | ... | ... |
| 43 | ... | ... | ... |

151

IMAGE FORMING APPARATUS

BACKGROUND OF THE INVENTION

1. Field of the Invention

The present invention relates to an image forming apparatus.

2. Description of Related Art

Conventionally, in an electrographic image forming apparatus, an image is formed by forming a toner image on an image carrier such as a photoconductor drum, an intermediate transfer belt or the like based on image data, transferring the toner image on a paper, and fixing the toner image which is transferred on the paper by heating/pressuring. When there is a large amount of toner, paper wraps around the image carrier at the time of transferring and it becomes difficult to separate the paper from the image carrier. Specifically, in a case of a full-color image forming apparatus, toners of plurality of colors (yellow, magenta, cyan and black) are layered. Therefore, adhesion amount of toner to a paper becomes large and the wrapping of paper can occur easily.

In order to prevent this wrapping of paper, normally, the maximum value of YMCK data is set at the time when the color conversion process of converting RBG data to YMCK data is carried out so that the YMCK data after conversion does not exceed the maximum value. In a case where the image is all black, the output is controlled so as to be held down to 250% as a whole, for example, while the output should be total of 400% in which all of YMCK have output of 1000, normally.

Moreover, when toner is not enough to fill unevenness of paper surface, image quality is degraded. Therefore, there is suggested an image forming apparatus in which adhesion amount of toner is increased as the roughness of paper surface becomes greater (JP 2004-258397).

Further, there is suggested an image forming apparatus in which environmental condition such as temperature, humidity and the like of the place where the image forming apparatus is set is detected and in which the maximum value of amount of toner per unit area to be used at the time of printing to a print medium is changed according to the detection signal (JP 2004-78025).

Meanwhile, the easiness of occurrence of wrapping of paper to the photoconductor drum or the intermediate transfer belt differs according to type of the paper. For example, the wrapping tends to occur easily when the paper is a thin paper, and further, the wrapping tends to occur easily when the paper is in large size. Conventionally, a color conversion process condition is uniformly set by setting a paper which can be wrapped around easily as a basis. Therefore, color conversion process in which density is held down more than needed has been carried out to a paper of paper type which does not cause the wrapping. Thus, there is a problem that color gamut which can be reproduced becomes narrow in a case where a paper of a paper type in which the adhesion amount of toner does not need to be hold down is to be used.

Furthermore, conventionally, color conversion process condition is set uniformly by setting an image in which the wrapping can occur easily as a basis, that is, by setting an image in which adhesive amount of toner is greater as a basis. Therefore, color conversion process in which density is held down more than needed has been carried out to the image having density which does not cause the wrapping. Thus, there is a problem that color gamut which can be reproduced becomes narrow when forming an image in which the adhesive amount of toner does not need to be held down.

SUMMARY OF THE INVENTION

In view of the above problems of the prior arts, an object of the present invention is to make the color gamut after color conversion process be preferably wide while preventing the paper from being wrapped around the image carrier.

In order to realize the above object, an image forming apparatus reflecting one aspect of the present invention comprises an image forming unit which forms a toner image on an image carrier and transfers the formed toner image on a paper, a color conversion process unit to carry out a color conversion process to convert inputted image data to image data of an output color in the image forming unit, a paper type information obtaining unit to obtain at least one or more information among a size of a paper, a basis weight of the paper and whether the paper is coated or not and a control unit to control so as to change a maximum adhesion amount of a toner to a paper by selecting a color conversion process condition for the color conversion process unit based on the information obtained by the paper type information obtaining unit.

In the above image forming apparatus, preferably, a selecting of the color conversion process condition for the color conversion process unit by the control unit is a selecting of a three dimensional look-up table to be used in the color conversion process in the color conversion process unit.

In the above image forming apparatus, preferably, the output color in the image forming unit includes yellow, magenta, cyan and black, and the control unit controls so as to change the maximum adhesion amount of the toner to the paper by setting a maximum adhesion amount of a black toner to a constant and by changing a maximum adhesion amount of a toner of yellow, a magenta and cyan.

In the above image forming apparatus, preferably, the output color in the image forming unit includes yellow, magenta, cyan and black, and the control unit controls so as to change the maximum adhesion amount of the toner to the paper by setting a maximum adhesion amount of a toner of yellow, magenta and cyan to a constant and by changing a maximum adhesion amount of a black toner.

In order to realize the above object, an image forming apparatus reflecting another aspect of the present invention comprises an image forming unit which forms a toner image on an image carrier and transfers the formed toner image on a paper, a color conversion process unit to carry out a color conversion process to convert inputted image data to image data of an output color in the image forming unit and a control unit to make the color conversion process unit carry out a preparatory color conversion process to the inputted image data, to determine whether a pixel value of each pixel constituting image data after the preparatory color conversion process is greater than or equal to a threshold which is predetermined or not, to detect the number of pixels in which the pixel value is greater than or equal to the threshold, to select a color conversion process condition for the color conversion process unit based on the detected number of pixels in which the pixel value is greater than or equal to the threshold, and to make the color conversion process unit carry out an actual color conversion process to the inputted image data according to the selected color conversion process condition.

In the above image forming apparatus, preferably, the control unit selects the color conversion process condition which makes the pixel value of each pixel constituting the image data after the color conversion process by the color conversion process unit be small as the number of pixels in which the pixel value is greater than or equal to the threshold is greater.

In the above image forming apparatus, preferably, the threshold is different for each of areas which are made by dividing an image generated by the image data after the color conversion process by the color conversion process unit in a plurality of areas.

In the above image forming apparatus, preferably, the threshold is smaller in an area corresponding to a top of the paper among the plurality of areas comparing to other areas.

In the above image forming apparatus, preferably, a selecting of the color conversion process condition for the color conversion process unit by the control unit is a selecting of a three dimensional look-up table to be used in the color conversion process in the color conversion process unit.

In the above image forming apparatus, preferably, the output color in the image forming unit includes yellow, magenta, cyan and black, and the control unit selects the color conversion process condition for the color conversion process unit so as to set a maximum adhesion amount of a black toner to a constant and so as to change a maximum adhesion amount of a toner of yellow, magenta and cyan.

In the above image forming apparatus, preferably, the output color in the image forming unit includes yellow, magenta, cyan and black, and the control unit selects the color conversion process condition for the color conversion process unit so as to set a maximum adhesion amount of a toner of yellow, magenta and cyan to a constant and so as to change a maximum adhesion amount of a black toner.

In order to realize the above object, an image forming apparatus reflecting another aspect of the present invention comprises an image forming unit which forms a toner image on an image carrier and transfers the formed toner image on a paper, a color conversion process unit to carry out a color conversion process to convert inputted image data to image data of an output color in the image forming unit and a control unit to make the color conversion process unit carry out a preparatory color conversion process to the inputted image data, to determine whether a color of each pixel constituting image data after the preparatory color conversion process fulfills a determination condition which is predetermined or not, to detect the number of pixels which fulfill the determination condition, to select a color conversion process condition for the color conversion process unit based on the detected number of pixels which fulfill the determination condition, and to make the color conversion process unit carry out an actual color conversion process to the inputted image data according to the selected color conversion process condition.

In the above image forming apparatus, preferably, a selecting of the color conversion process condition for the color conversion process unit by the control unit is a selecting of a three dimensional look-up table to be used in the color conversion process in the color conversion process unit.

In the above image forming apparatus, preferably, the output color in the image forming unit includes yellow, magenta, cyan and black, and the control unit selects the color conversion process condition for the color conversion process unit so as to set a maximum adhesion amount of a black toner to a constant and so as to change a maximum adhesion amount a toner yellow, magenta and cyan.

In the above image forming apparatus, preferably, the output color in the image forming unit includes yellow, magenta, cyan and black, and the control unit selects the color conversion process condition for the color conversion process unit so as to set a maximum adhesion amount of a toner of yellow, magenta and cyan to a constant and so as to change a maximum adhesion amount of a toner of black.

BRIEF DESCRIPTION OF THE DRAWINGS

The present invention will become fully understood from the detailed description given hereinbelow and the appended drawings, and thus are not intended as a definition of the limits of the present invention, and wherein.

DESCRIPTION OF THE PREFERRED EMBODIMENTS

[First Embodiment]

Hereinafter, the first embodiment of the present invention will be described with reference to FIGS. 1 to 8.

First, the structure will be described.

Figure 1:
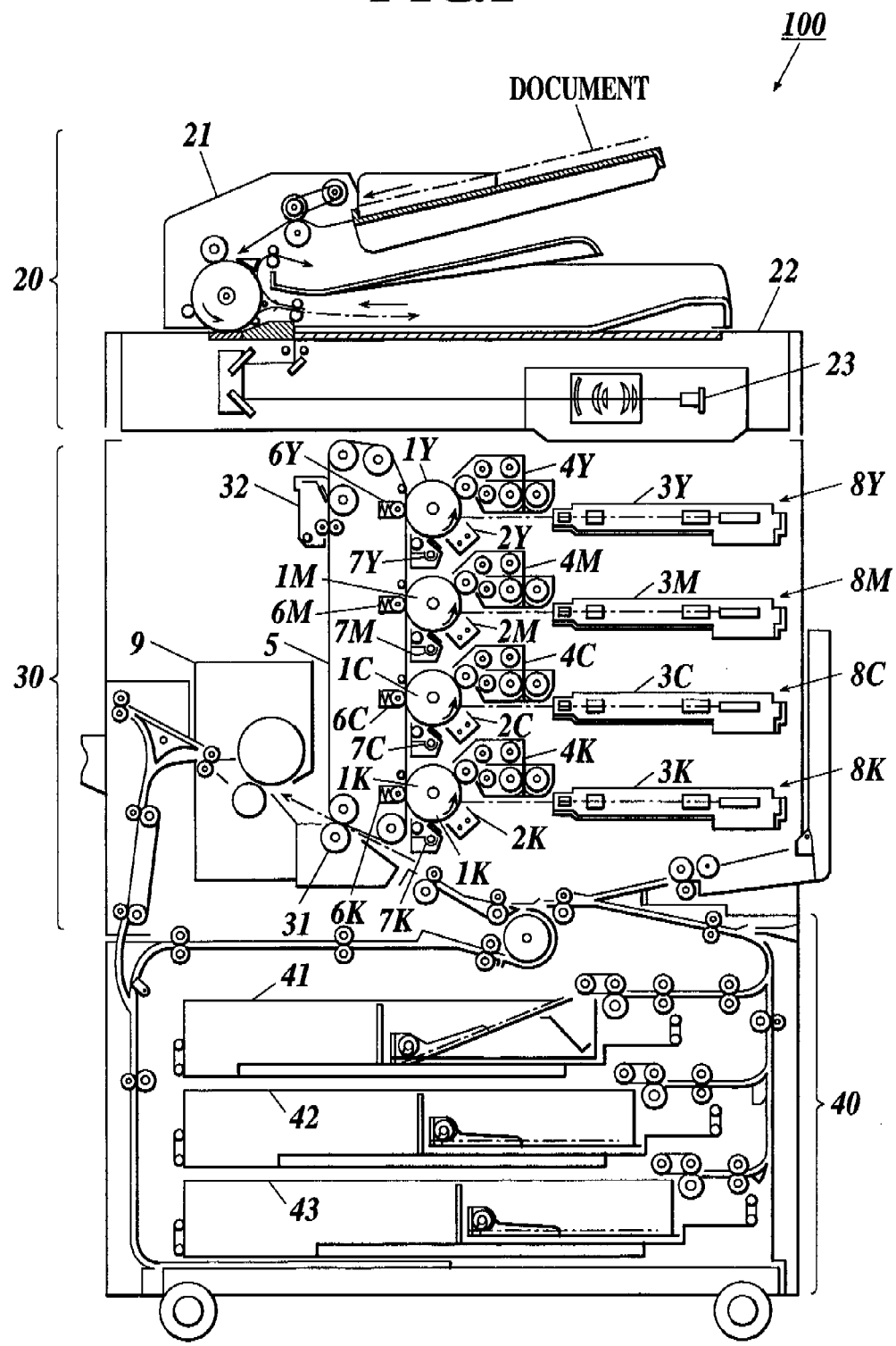
FIG. 1 is a schematic diagram of an image forming apparatus in the first embodiment of the present invention.

FIG. 1 is a schematic diagram of the image forming apparatus 100 in the first embodiment. As shown in FIG. 1, the image forming apparatus 100 comprises an image reading unit 20, an image forming unit 30, a paper feeding unit 40 and the like.

The image reading unit 20 comprises a document sending unit 21 to automatically send documents and a scanner unit 22. The document sending unit 21 conveys a document which is placed on the document table by the conveying mechanism to send the document out to the scanner unit 22. The scanner unit 22 carries out light scanning to the document and carries out photoelectric conversion by a line image sensor CCD 23 to read the document image, and the scanner unit 22 generates image data of red (R), green (G) and blue (B).

The image forming unit 30 comprises image forming units 8Y, 8M, 8C and 8K of each color, an intermediate transfer belt 5, a fixing device 9 to fix the toner image by heating/pressure, a paper conveyance unit and the like. The image forming units 8Y, 8M, 8C and 8K of each color are disposed along the scanning-width direction in the order of colors by which the toner image is to be transferred on the intermediate transfer belt 5.

The image forming unit 8Y which forms an image of yellow (Y) comprises a photoconductor drum 1Y, a charging unit 2Y, an exposure unit 3Y, a developing unit 4Y and a photoconductor cleaning unit 7Y. The charging unit 2Y uniformly charges the photoconductor drum 1Y. The exposure unit 3Y exposes the charged photoconductor drum 1Y to form an electrostatic latent image based on image data (Y data). The developing unit 4Y attaches yellow toner to the photoconductor drum 1Y to form a toner image of yellow. The photoconductor cleaning unit 7Y removes residual toner on the photoconductor drum 1Y after the toner image of yellow is transferred on the intermediate transfer belt 5 from the photoconductor drum 1Y.

The image forming unit 8M which forms an image of magenta (M) comprises a photoconductor drum 1M, a charging unit 2M, an exposure unit 3M, a developing unit 4M and a photoconductor cleaning unit 7M. The charging unit 2M uniformly charges the photoconductor drum 1M. The exposure unit 3M exposes the charged photoconductor drum 1M to form an electrostatic latent image based on image data (M data). The developing unit 4M attaches magenta toner to the photoconductor drum 1M to form a toner image of magenta. The photoconductor cleaning unit 7M removes residual toner on the photoconductor drum 1M after the toner image of magenta is transferred on the intermediate transfer belt 5 from the photoconductor drum 1M.

The image forming unit 8C which forms an image of cyan (C) comprises a photoconductor drum 1C, a charging unit 2C, an exposure unit 3C, a developing unit 4C and a photoconductor cleaning unit 7C. The charging unit 2C uniformly charges the photoconductor drum 1C. The exposure unit 3C exposes the charged photoconductor drum 1C to form an electrostatic latent image based on image data (C data). The developing unit 4C attaches cyan toner to the photoconductor drum 1C to form a toner image of cyan. The photoconductor cleaning unit 7C removes residual toner on the photoconductor drum 1C after the toner image of cyan is transferred on the intermediate transfer belt 5 from the photoconductor drum 1C.

The image forming unit 8K which forms an image of black (K) comprises a photoconductor drum 1K, a charging unit 2K, an exposure unit 3K, a developing unit 4K and a photoconductor cleaning unit 7K. The charging unit 2K uniformly charges the photoconductor drum 1K. The exposure unit 3K exposes the charged photoconductor drum 1K to form an electrostatic latent image based on image data (K data). The developing unit 4K attaches black toner to the photoconductor drum 1K to form a toner image of black. The photoconductor cleaning unit 7K removes residual toner on the photoconductor drum 1K after the toner image of black is transferred on the intermediate transfer belt 5 from the photoconductor drum 1K.

In the developing units 4Y, 4M, 4C and 4K, development is carried out by reversal development in which a developing bias in which AC voltage is superimposed to DC voltage of same polarity (negative polarity in the embodiment) as a toner polarity of the toner to be used is applied.

The intermediate transfer belt 5 is an image carrier in which the toner images of each color which are formed on the photoconductor drums 1Y, 1M, 1C and 1K are transferred to form a color toner image. Here, the image carrier is a unit which carries the toner images before being transferred onto a paper. The toner images of each color which are formed on the photoconductor drums 1Y, 1M, 1C and 1K are sequentially transferred onto the rotating intermediate transfer belt 5 by the primary transfer roller 6Y, 6M, 6C and 6K to which a primary transfer bias of opposite polarity (positive polarity in the embodiment) of the toner to be used is applied, and a color toner image in which each of the colors are layered is formed (first transferring).

A plurality of paper feeding trays 41, 42 and 43 are provided to the paper feeding unit 40, and papers taken out from the paper feeding trays 41, 42 and 43 are conveyed to the image forming unit 30. The papers contained in the paper feeding trays 41, 42 and 43 are conveyed to the secondary transfer roller 31 via the conveyance roller, the resist roller and the like. Then, the color toner image is transferred onto the paper from the intermediate transfer belt 5 at once by the secondary transfer roller 31 (secondary transferring). After transferring the color toner image onto the paper by the secondary transfer roller 31, the residual toner is removed from the intermediate transfer belt 5 in which the paper is separated by self stripping by the intermediate transferred belt cleaning unit 32.

Fixing process is carried out to the paper to which the color toner image is transferred by the fixing device 9, and the paper is sandwiched by the paper ejection rollers to be placed on an external paper ejection tray.

Figure 2:
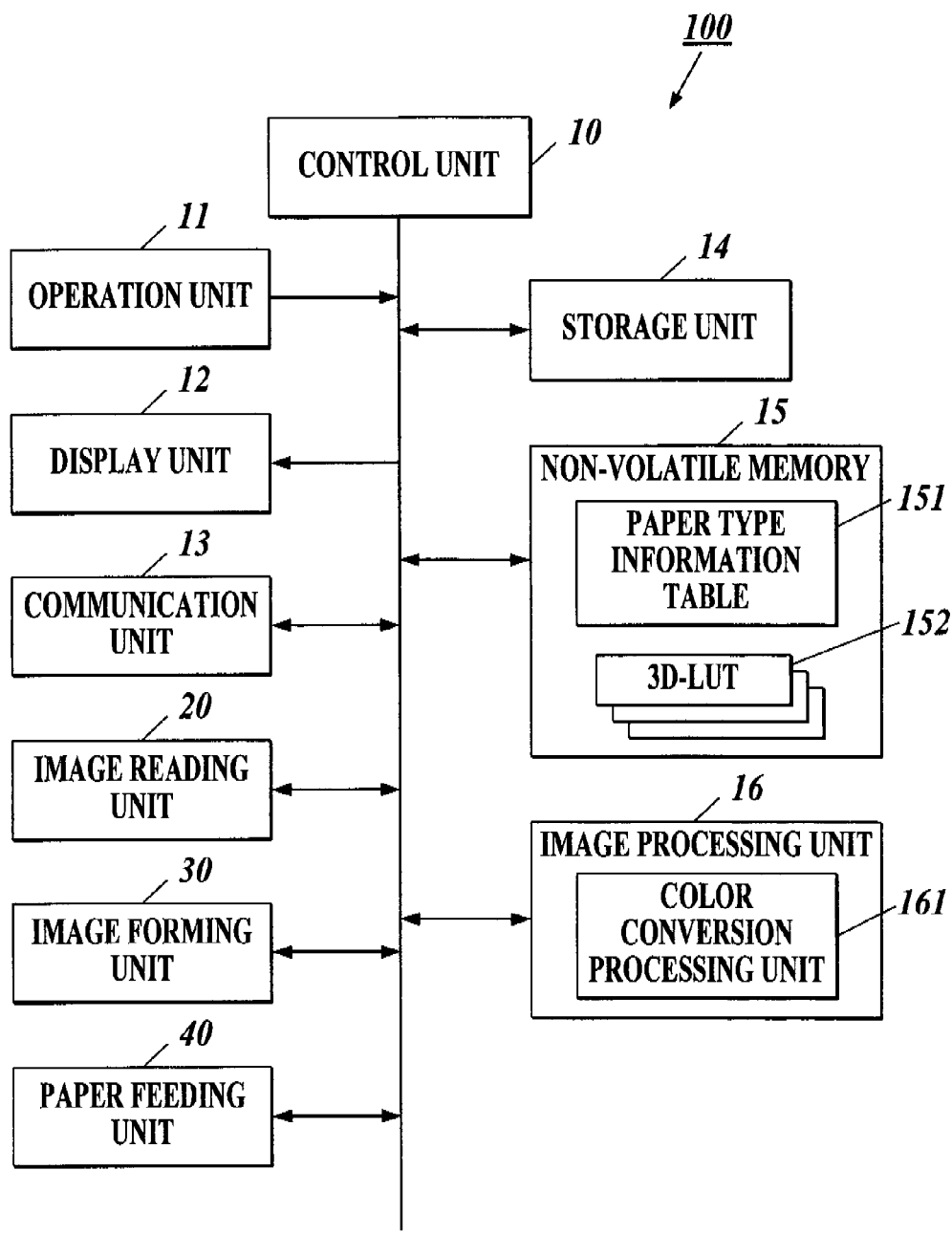
FIG. 2 is a block diagram showing a functional structure of the image forming apparatus.

FIG. 2 is a block diagram showing a functional structure of the image forming apparatus 100. As shown in FIG. 2, the image forming apparatus 100 comprises a control unit 10, an operation unit 11, a display unit 12, a communication unit 13, the image reading unit 20, the image forming unit 30, the paper feeding unit 40, a storage unit 14, a non-volatile memory 15, an image processing unit 16 and the like. Among the functional units shown in FIG. 2, the same symbols are used for the parts which are described by referring to FIG. 1 and the descriptions are omitted.

The control unit 10 comprises a CPU (Central Processing Unit), a RAM (Random Access Memory) and the like. The CPU reads various types of processing programs which are stored in the storage unit 14 and expands the programs in the RAM. Further, the CPU integrally controls the processing operation of each part of the image forming apparatus 100 by cooperating with the programs.

The operation unit 11 is a functional unit which receives operations by a user. The operation unit 11 comprises various types of buttons such as number buttons, a start button, a reset button and the like, and outputs a pushed signal of the pushed button to the control unit 10. Furthermore, the operation unit 11 comprises a touch panel which is integrally formed with the display unit 12, and detects the position on the touch panel where touched by a finger tip of a user, a touch pen and the like and outputs the positional signal to the control unit 10.

The display unit 12 comprises a LCD (Liquid Crystal Display) and the like, and displays various types of operation screens, processing results and the like according to instruction of the display signal which is inputted from the control unit 10.

The communication unit 13 is an interface for carrying out sending and receiving of data between external devices such as a PC (Personal Computer) and the like.

The storage unit 14 is a storage device such as a hard disk and stores various types of processing programs and various types of data.

In the non-volatile memory 15, a paper type information table 151, a plurality of types of three dimensional look-up table (hereinafter, called 3D-LUT) 152 are stored. Further, in the non-volatile memory 15, thresholds E1, E2 of basis weight of paper and thresholds F1, F2, F3 and F4 of paper size which are to be used in the first image forming process (see FIGS. 6 and 7) are stored. These values are set in advance. However, they can be changed arbitrarily. Here, as for the paper size, the size may be assigned by standard sizes (A4, B4 and the like) or may be assigned by length of scanning-width direction at the time of image forming. Furthermore, the thresholds are set so as to be E1<E2, F3<F1 and F4<F2.

Figure 3:
FIG. 3 is a diagram showing a paper type information table.

In the paper type information table 151, paper type information indicating the size, the basis weight of the papers housed in each of the paper feeding trays 41, 42 and 43 and whether the paper is coated or not is stored, as shown in FIG. 3. The paper type information table 151 is prepared in advance by a user inputting the paper type information of the papers which are housed in the paper feeding trays 41, 42 and 43 from the operation unit 11. In general, wrapping of the paper to the intermediate transfer belt 5 occurs easily when the paper size is larger, the wrapping of the paper to the intermediate transfer belt 5 occurs easily when the basis weight of the paper is smaller, and the wrapping of the paper to the intermediate transfer belt 5 occurs easily when the paper is coated.

The 3D-LUT 152 is a look-up table to be used for color conversion process in which RGB data is converted to YMCK data, and the output value (YMCK data) is made to be corresponded to the input value (RGB data). The YMCK data is data consisted of image data of each color of YMCK, and the RGB data is data consisted of image data of each color of RGB. In the embodiment, three types of 3D-LUT 152 which are created so that the maximum adhesion amounts of toner are different are prepared. Here, in the embodiment, a case where RGB data is converted to YMCK data will be described as the color conversion process. However, when YMCK data is input to the image forming apparatus 100 via the communication unit 13, the 3D-LUT for carrying out color conversion process in which YMCK data is converted to YMCK data should be used.

Figure 4:
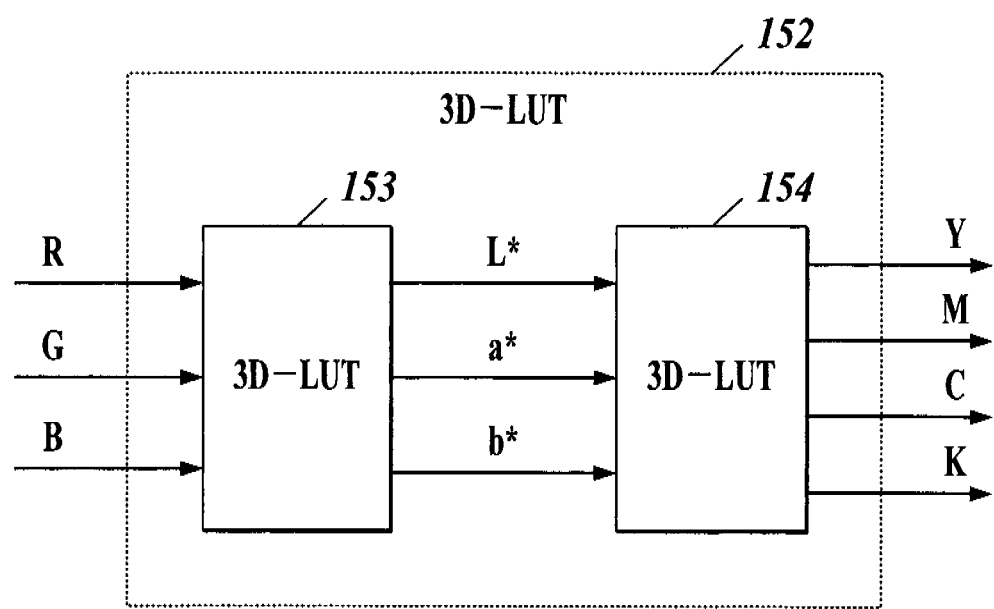
FIG. 4 is a schematic diagram of a three dimensional look-up table which is used for a color conversion process in which RGB data is converted to YMCK data.

Here, specific creating method of the 3D-LUT 152 will be described with reference to FIG. 4. First, 3D-LUT 153 which converts RGB data to L*a*b* data is created.

Next, 3D-LUT 154 which converts the L*a*b* data to YMCK data is created. The 3D-LUT 154 includes GDR (Gray Component Replacement) process which adjusts how much of K data should replace the YMC data.

Figure 5A:
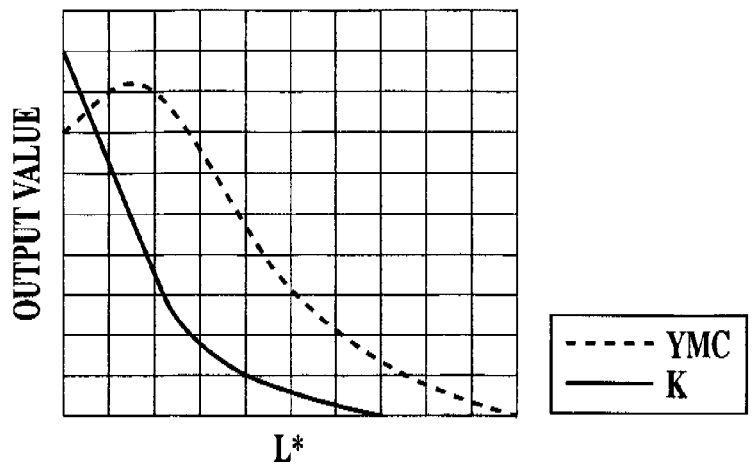
FIG. 5A shows a conversion curve in a case where the maximum adhesion amount of toner is the greatest.
Figure 5B:
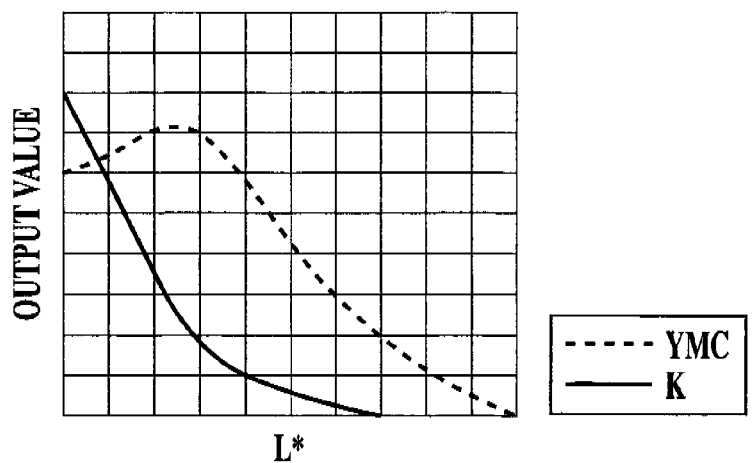
FIG. 5B shows a conversion curve in a case where the maximum adhesion amount of toner is intermediate.
Figure 5C:
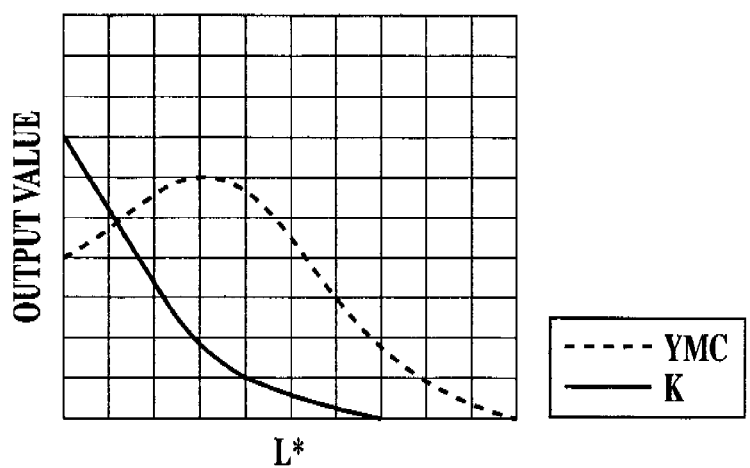
FIG. 5C shows a conversion curve in a case where the maximum adhesion amount of toner is the smallest.

FIGS. 5A to 5C are examples of conversion curves showing output values (YMCK data) with respect to L* data when a*=0 and b*=0. In FIGS. 5A to 5C, the conversion curve which converts L* data to K data (black) is shown in a solid line, and the conversion curve which converts L* data to YMC data (yellow, magenta and cyan) is shown in a dashed line. Among FIGS. 5A to 5C, FIG. 5A is the conversion curve of a case where the upper limit value of image data (YMCK data) after the color conversion process is the greatest and where the maximum adhesion amount of toner is the greatest. Among FIGS. 5A to 5C, FIG. 5B is the conversion curve of a case where the upper limit value of image data after the color conversion process is intermediate and where the maximum adhesion amount of toner is intermediate. Among FIGS. 5A to 5C, FIG. 5C is the conversion curve of a case where the upper limit value of image data after the color conversion process is the smallest and where the maximum adhesion amount of toner is the smallest. Here, an example is shown for a case where a common conversion curve is used for yellow, magenta and cyan and an independent conversion curve is used only for black. However, independent conversion curves may be also created for yellow, magenta and cyan.

In both of the conversion curve which converts L* data to K data and the conversion curve which converts L* data to YMC data, the output values which are converted from the same L* value become gradually smaller in the order of FIG. 5A, FIG. 5B and FIG. 5C. Further, in the order of FIG. 5A, FIG. 5B and FIG. 5C, the peak (a portion where the output value is greatest) position of the conversion curve which converts L* data to YMC data is shifted to the direction in which L* is greater. The 3D-LUT 154 is created by deciding the conversion curves such as FIGS. 5A to 5C for all of the values of a* and b*.

Then, lastly, by combining the 3D-LUT 153 and the 3D-LUT 154, the 3D-LUT 152 to convert RGB data to YMCK data is created.

The image processing unit 16 generates image data for writing based on the image data generated by the image reading unit 20 or the image data received by the communication unit 13, and supplies the image data (YMCK data) to the exposure units 3Y, 3M, 3C and 3K of the image forming unit 30. The image processing unit 16 includes the color conversion process unit 161. The image processing unit 16 may be realized by a software process in which the CPU of the control unit 10 and the programs stored in the storage unit 14 cooperate with one another, or may use the DSP (Digital Signal Processor).

The image processing includes a RGB tone correction process, a filter processing, the color conversion process, a YMCK tone correction process, a screen processing and the like. The RGB tone correction process is a process to adjust tone characteristic of RGB data in the image reading unit 20. The filter processing is a process which is carried out for the purpose of moiré prevention, smoothing, sharpening and the like. The color conversion process is a process to convert RGB data (inputted image data) to YMCK data (image data of output color in the image forming unit 30). The YMCK tone correction process is a process to adjust tone characteristic of YMCK data in the image forming unit 30. The screen processing is a process to express the tone (density) by using a plurality of screens.

When the paper feeding tray 41, 42, 43 is selected in the operation unit 11 by an operation of a user or when the selection instruction of the paper feeding tray 41, 42 and 43 is received by the communication unit 13, the control unit 10 obtains the paper type information indicating the size, the basis weight of the papers corresponding to the selected paper feeding trays 41, 42 and 43 and whether the papers are coated or not from the paper type information table 151 of the non-volatile memory 15.

By selecting the 3D-LUT 152 to be used in the color conversion process in the color conversion process unit 16 based on the obtained paper type information, the control unit 10 controls so as to change the maximum adhesion amount of toner to the paper. That is, by selecting the 3D-LUT 152 to be used for the color conversion process, the control unit 10 selects color conversion process condition for the color conversion process unit 161.

Next, the operation will be described.

Figure 6:
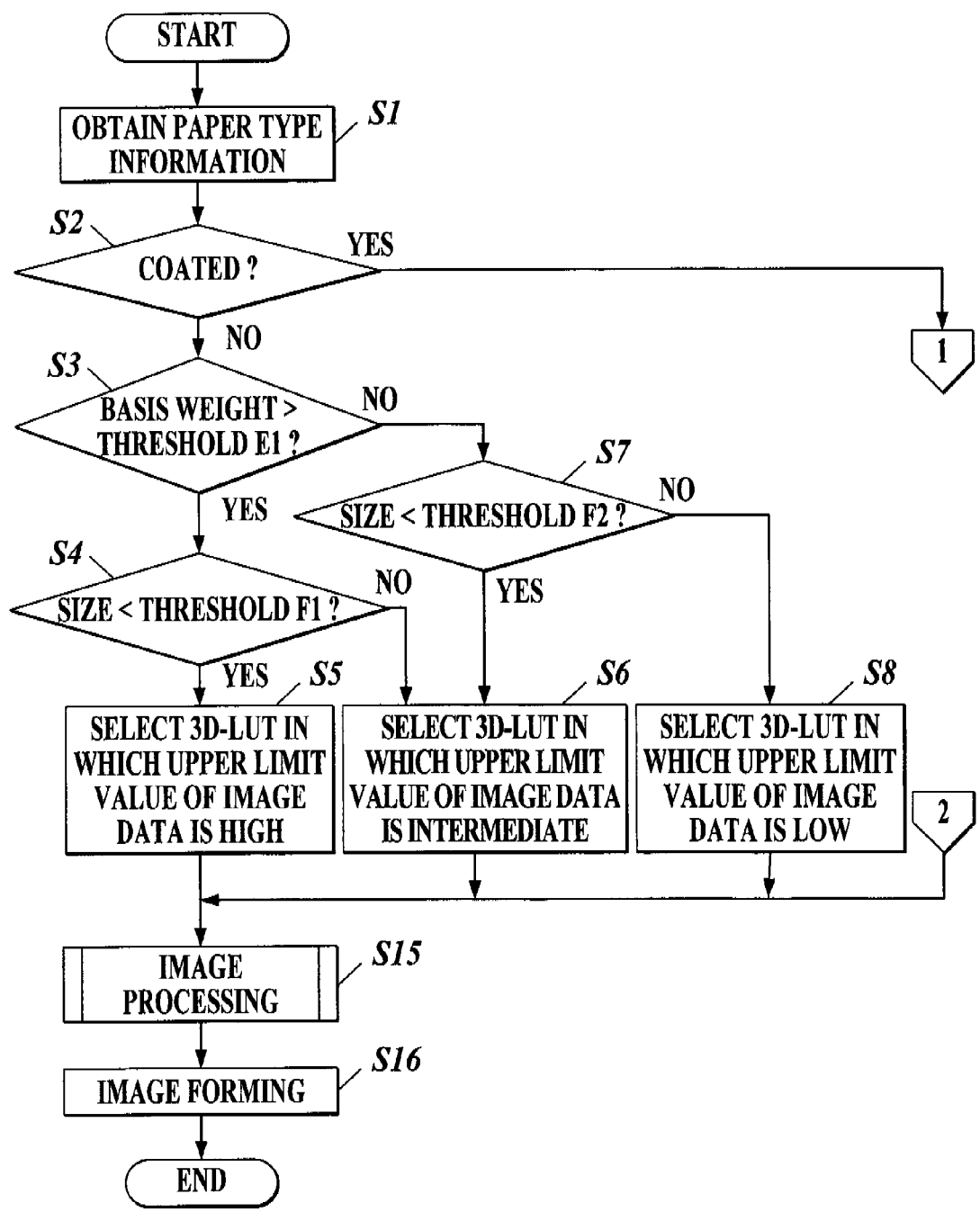
FIG. 6 is a flowchart showing the first image forming process.
Figure 7:
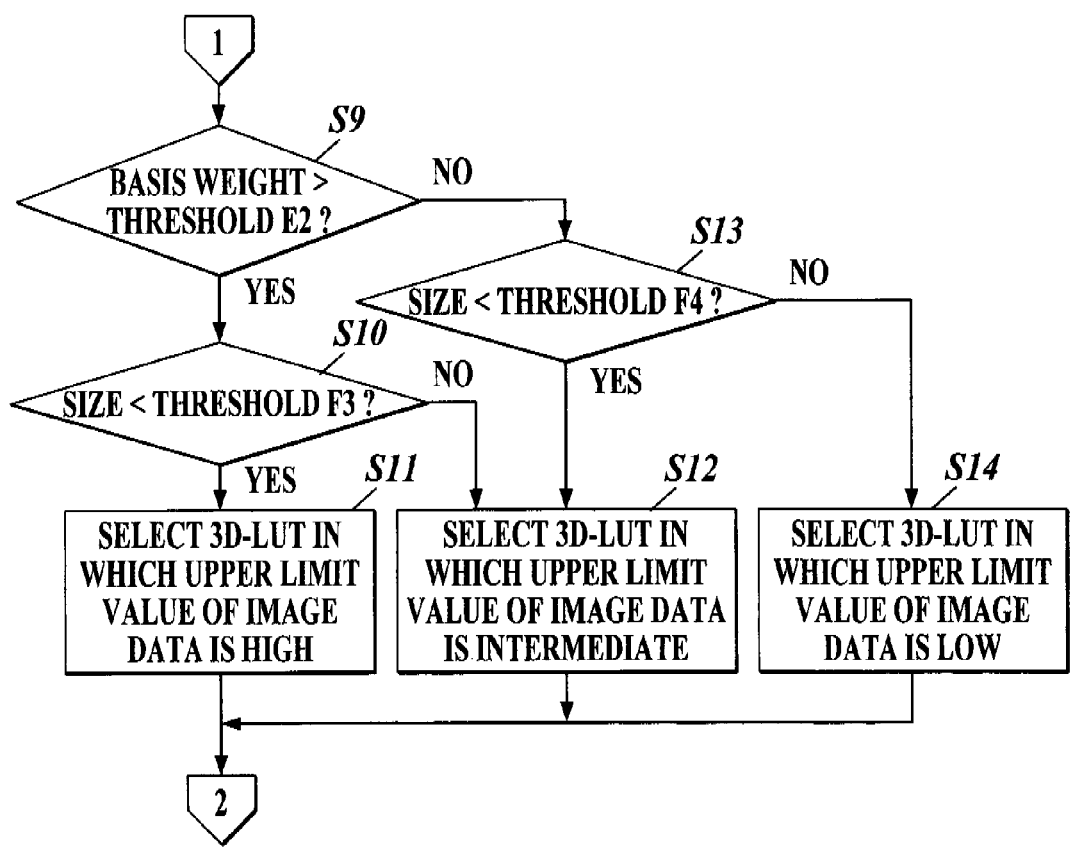
FIG. 7 is a flowchart showing the first image forming process.

FIGS. 6 and 7 are flowcharts showing the first image forming process which is executed in the image forming apparatus 100. This process is realized by a software process in which the CPU of the control unit 10 and the programs stored in the storage unit 14 cooperate with one another.

First, when the paper feeding tray 41, 42, 43 is selected from the operation unit 11 by an operation of a user or when the selection instruction of the paper feeding tray 41, 42, 43 is received by the communication unit 13, the control unit 10 obtains the paper type information indicating the size, the basis weight of the papers corresponding to the selected paper feeding tray 41, 42, 43 and whether the papers are coated or not from the paper type information table 151 of the non-volatile memory 15 by the control unit 10 (step S1).

Next, the control unit 10 determines whether the selected paper is coated or not based on the obtained paper type information (step S2). When the selected paper is not coated (step S2; NO), the control unit 10 determines whether the basis weight of the selected paper is greater than the threshold E1 or not based on the paper type information (step S3). When the basis weight of the selected paper is greater than the threshold E1 (step S3; YES), the control unit 10 determines whether the size of the selected paper is smaller than the threshold F1 or not based on the paper type information (step S4). When the size of the selected paper is smaller than the threshold F1 (step S4; YES), the control unit 10 selects the 3D-LUT 152 in which the upper limit value of image data (YMCK data) after the color conversion process is the greatest (step S5). That is, the control unit 10 selects the 3D-LUT 152 in which the maximum adhesion amount of toner to the paper is greatest.

In step S4, when the size of the selected paper is greater than or equal to the threshold F1 (step S4; NO), the control unit 10 selects the 3D-LUT 152 in which the upper limit value of image data after the color conversion process is intermediate (step S6). That is, the control unit 10 selects the 3D-LUT 152 in which the maximum adhesion amount of toner to the paper is intermediate.

In step S3, when the basis weight of the selected paper is smaller than or equal to the threshold E1 (step S3; NO), the control unit 10 determines whether the size of the selected paper is smaller than the threshold F2 or not based on the paper type information (step S7). When the size of the selected paper is smaller than the threshold F2 (step S7; YES), the control unit 10 selects the 3D-LUT 152 in which the upper limit value of image data after the color conversion process is intermediate (step S6). That is, the control unit 10 selects the 3D-LUT 152 in which the maximum adhesion amount of toner to the paper is intermediate.

In step S7, when the size of the selected paper is greater than or equal to the threshold F2 (step S7; NO), the control unit 10 selects the 3D-LUT 152 in which the upper limit value of image data after the color conversion process is the lowest (step S8). That is, the control unit 10 selects the 3D-LUT 152 in which the maximum adhesion amount of toner to the paper is the smallest.

In step S2, when the selected paper is coated (step S2; YES), the control unit 10 determines whether the basis weight of the selected paper is greater than the threshold E2 or not based on the paper type information (step S9). When the basis weight of the selected paper is greater than the threshold E2 (step S9; YES), the control unit 10 determines whether the size of the selected paper is smaller than the threshold F3 or not based on the paper type information (step S10). When the size of the selected paper is smaller than the threshold F3 (step S10; YES), the control unit 10 selects the 3D-LUT 152 in which the upper limit value of image data after the color conversion process is the greatest (step S11). That is, the control unit 10 selects the 3D-LUT 152 in which the maximum adhesion amount of toner to the paper is greatest.

In step S10, when the size of the selected paper is greater than or equal to the threshold F3 (step S10; NO), the control unit 10 selects the 3D-LUT 152 in which the upper limit value of image data after the color conversion process is intermediate is selected by the control unit 10 (step S12). That is, the control unit 10 selects the 3D-LUT 152 in which the maximum adhesion amount of toner to the paper is intermediate.

In step S9, when the basis weight of the selected paper is smaller than or equal to the threshold E2 (step S9; NO), the control unit 10 determines whether the size of the paper is smaller than the threshold F4 or not based on the paper type information (step S13). When the paper size is smaller than the threshold F4 (step S13; YES), the control unit 10 selects the 3D-LUT 152 in which the upper limit value of image data after the color conversion process is intermediate (step S12). That is, the control unit 10 selects the 3D-LUT 152 in which the maximum adhesion amount of toner to the paper is intermediate.

In step S13, when the paper size is greater than or equal to the threshold F4 (step S13; NO), the control unit 10 selects the 3D-LUT 152 in which the upper limit value of image data after the color conversion process is the smallest (step S14). That is, the control unit 10 selects the 3D-LUT 152 in which the maximum adhesion amount of toner to the paper is the smallest.

In such way, the 3D-LUT 152 which is to be used for the color conversion process in the color conversion process unit 161 is selected by the control unit 10 based on the paper type information obtained in step S1 (steps S5, S6, S8, S11, S12 and S14). That is, the maximum adhesion amount of toner to the paper is changed based on the paper type information.

After step S5, step S6, step S8, step S11, step S12 or step S14, image processing is carries out to the image data generated by the image reading unit 20 or to the image data (RGB data) received by the communication unit 13 (step S15).

Here, the image processing will be described with reference to FIG. 8.

First, the control unit 10 determines whether it is a copy output or not, that is, whether the image processing is to be carried out to the image data generated by the image reading unit 20 or whether the image processing is to be carried out to the image data received by the communication unit 13 (step S21).

When it is a copy output (step S21; YES), the RGB tone correction process is carried out to RGB data which is the image processing target by the image processing unit 16 (step S22), and thereafter, the filter processing is carried out (step S23).

In step S21, when it is not a copy output (step S21; NO) or after step S23, the color conversion process is carried out to RGB data by the color conversion process unit 161 of the image processing unit 16 by using the 3D-LUT 152 selected in step S5, step S6, step S8, step S11, step S12 or step S14 (step S24). In particular, RGB data is converted to YMCK data by the color conversion process unit 161.

Next, the YMCK tone correction process is carried out to YMCK data by the image processing unit 16 (step S25), and then, the screen processing is carried out (step S26).

Next, returning to FIG. 6, the image forming unit 30 carries out an image forming to a paper according to a control by the control unit 10 (step S16).

This is the end of the first image forming process.

As described above, according to the image forming apparatus 100 in the first embodiment, the paper type information indicating size and basis weight of the paper to which the image forming is carried out and whether the paper is coated or not is obtained, and the maximum adhesion amount of toner to the paper is controlled so as to be changed by selecting color conversion process condition for the color conversion process unit 161 based on the obtained paper type information. Therefore, color gamut after the color conversion process can be made to be preferably side while preventing the paper from being wrapped around the intermediate transfer belt 5.

In particular, the image forming apparatus 100 selects a 3D-LUT 152 based on the paper type information indicating size and basis weight of the paper and whether the paper is coated or not so that the maximum adhesion amount of toner be greater when the paper size is smaller, that the maximum adhesion amount of toner be greater when the basis weight is greater and that the maximum adhesion amount of toner be greater when the paper is not coated. In such way, when the paper is a type of paper which is not likely to be wrapped around the intermediate transfer belt 5, the maximum adhesion amount of toner can be increased to make the color gamut after the color conversion process be preferably wide. On the other hand, when the paper is a type of paper which is likely to be wrapped around the intermediate transfer belt 5, the maximum adhesion amount of toner can be held down and the wrapping of the paper to the intermediate transfer belt 5 can be prevented.

Here, in the first embodiment, the same 3D-LUT 152 (the 3D-LUT 152 in which the upper limit value of image data after the color conversion is intermediate) is selected in a case where the paper is not coated (step S2; NO), the basis weight of the paper is greater than the threshold E1 (step S3; YES) and the paper size is greater than or equal to the threshold F1 (step S4; NO) and in a case where the paper is not coated (step S2; NO), the basis weight of the paper is smaller than or equal to the threshold E1 (step S3; NO) and the paper size is smaller than the threshold F2 (step S7; YES). However, different 3D-LUT 152 may be used in the above two cases. Similarly, different 3D-LUT 152 can be used in a case where the paper is coated (step S2; YES), the basis weight of the paper is greater than the threshold E2 (step S9; YES) and the paper size is greater than or equal to the threshold F3 (step S10; NO) and in a case where the paper is coated (step S2; YES), the basis weight of the paper is smaller than or equal to the threshold E2 (step S9; NO) and the paper size is smaller than the threshold F4 (step S13; YES).

Moreover, in the first embodiment, the 3D-LUT 152 which is to be used for the color conversion process in the color conversion process unit 161 is selected based on the paper type information which indicates size and basis weight of the paper and whether the paper is coated or not. However, 3D-LUT 152 may be selected based on any one or two of the paper size, the basis weight of the paper or whether the paper is coated or not.

MODIFICATION EXAMPLE 1

Next, the modification example 1 will be described as a modification example of the first embodiment.

The modification example 1 is an example of a case where the maximum adhesion amount of toner to a paper is changed by setting the maximum adhesion amount of black toner at constant and by changing the maximum adhesion amount of toner of yellow, magenta and cyan.

The image forming apparatus of the modification example 1 is structured similarly as the image forming apparatus 100 shown in the first embodiment. Therefore, FIGS. 1 to 4 are incorporated and referred to here, and drawings and descriptions are omitted. Hereinafter, characteristic structures and processes in the modification example 1 will be described.

First, method of creating 3D-LUT 152 in the modification example 1 will be described. First, the 3D-LUT 152 which converts RGB data to L*a*b* data is created.

Next, the 3D-LUT 154 which converts the L*a*b* data to YMCK data is created. In the 3D-LUT 154, GCR process is also included.

Figure 9A:
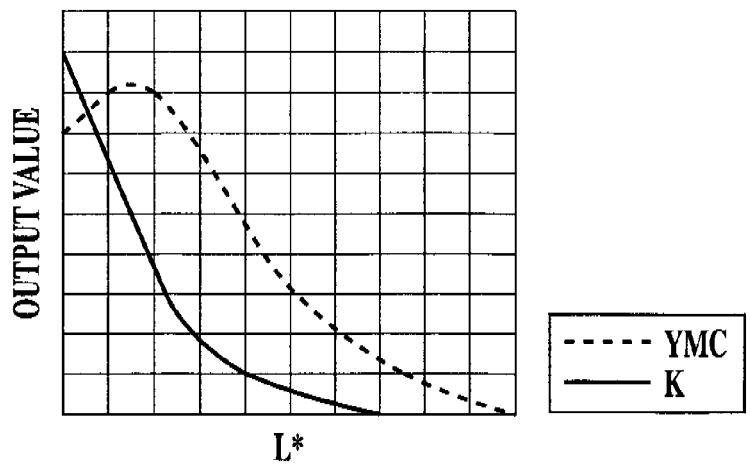
FIG. 9A shows a conversion curve in a case where the maximum adhesion amount of toner is the greatest in a modification example 1.
Figure 9B:
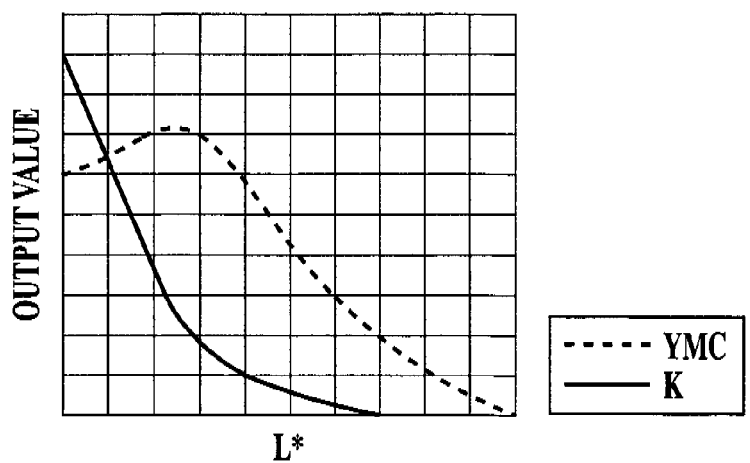
FIG. 9B shows a conversion curve in a case where the maximum adhesion amount of toner is intermediate in the modification example 1.
Figure 9C:
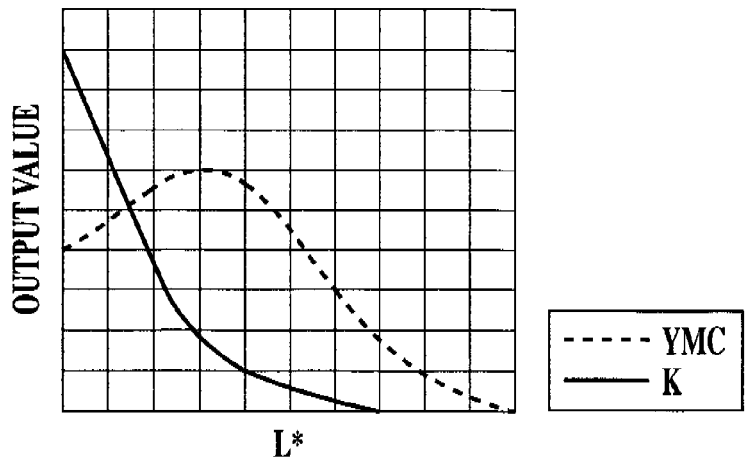
FIG. 9C shows a conversion curve in a case where the maximum adhesion amount of toner is the smallest in the modification example 1.

FIGS. 9A to 9C are examples of conversion curves indicating the output value (YMCK data) with respect to the L* data when a*=0 and b*=0. In FIGS. 9A to 9C, the conversion curve in which the L* data is converted to K data (black) is shown in a solid line, and the conversion curve in which the L* data is converted to YMC data (yellow, magenta and cyan) is shown in a dashed line. Among FIGS. 9A to 9C, FIG. 9A is the conversion curve of a case where the upper limit value of image data (YMCK data) after the color conversion process is the greatest and where the maximum adhesion amount of toner is the greatest. Among FIGS. 9A to 9C, FIG. 9B is the conversion curve of a case where the upper limit value of the image data after the color conversion process is intermediate and where the maximum adhesion amount of toner is intermediate. Among FIGS. 9A to 9C, FIG. 9C is the conversion curve of a case where the upper limit value of the image data after the color conversion process is the smallest and where the maximum adhesion amount of toner is the smallest.

The conversion curve in which the L* data is converted to K data is common in FIGS. 9A to 9C. As for the conversion curves in which the L* data is converted to YMC data, output values which are converted from the same L* value gradually decreases in the order of FIG. 9A, FIG. 9B and FIG. 9C, and further, peak positions (a part where the output value is greatest) of the conversion curves are shifted toward in the direction in which L* becomes large in the order of FIG. 9A, FIG. 9B and FIG. 9C. The 3D-LUT 154 is created by deciding conversion curves like FIGS. 9A to 9C in all of a* values and b* values.

Then, the 3D-LUT 153 and the 3D-LUT 154 are combined to create 3D-LUT 152 which converts RGB data to YMCK data.

When the paper feeding tray 41, 42, 43 is selected in the operation unit 11 by an operation of a user or when a selection instruction of the paper feeding tray 41, 42, 43 is received by the communication unit 13, the control unit 10 obtains the paper type information indicating size and basis weight of the paper corresponding to the selected paper feeding tray 41, 42, 43 and whether the paper is coated or not from the paper type information table 151 of the non-volatile memory 15.

By selecting the 3D-LUT 152 to be used for color conversion process in the color conversion unit 161 based on the obtained paper type information, the control unit 10 controls so as to change the maximum adhesion amount of toner to the paper. In particular, by setting the maximum adhesion amount of black toner to a constant and by changing the maximum adhesion amount of toner of yellow, magenta and cyan, the control unit 10 controls so as to change the maximum adhesion amount of toner to a paper.

Figure 8:
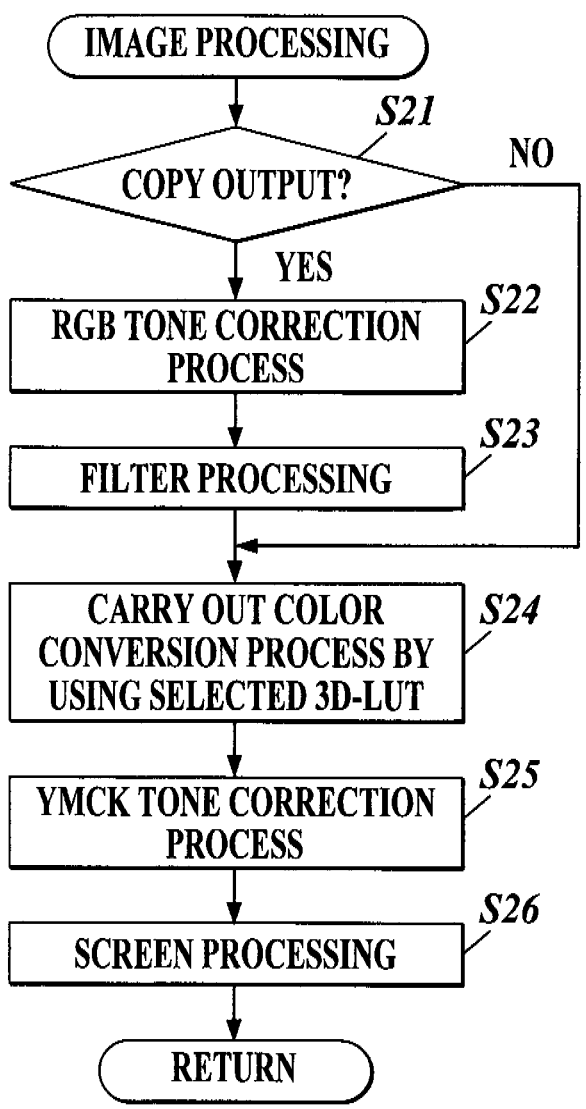
FIG. 8 is a flowchart showing an image processing.

In the process of the image forming apparatus of the modification example 1, only the 3D-LUT 152 to be used in the color conversion process is different and the other processes are same as the process shown in FIGS. 6 to 8. Therefore, the description is omitted.

As shown in the modification example 1, when the maximum adhesion amount of black toner is set to a constant and when the maximum adhesion amount of toner of yellow, magenta and cyan is to be changed, gray balance ban be stable because there is no change in black.

MODIFICATION EXAMPLE 2

Next, the modification example 2 will be described as a modification example of the first embodiment.

The modification example 2 is an example of a case where the maximum adhesion amount of toner to a paper is changed by setting the maximum adhesion amount of toner of yellow, magenta and cyan and by changing the maximum adhesion amount of black toner.

The image forming apparatus in the modification example 2 has a structure similar to the image forming apparatus 100 shown in the first embodiment. Therefore, FIGS. 1 to 4 are incorporated and referred to here, and drawings and descriptions are omitted. Hereinafter, characteristic structures and processes in the modification example 2 will be described.

First, method of creating 3D-LUT 152 in the modification example 2 will be described. First, 3D-LUT 153 to convert RGB data to L*a*b* data is created.

Next, 3D-LUT 154 to convert L*a*b* data to YMCK data is created. In the 3D-LUT 154, GCR process is also included.

Figure 10A:
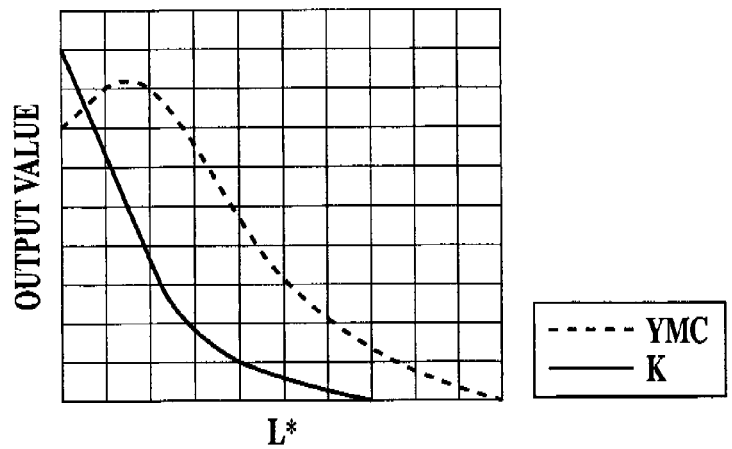
FIG. 10A shows a conversion curve in a case where the maximum adhesion amount of toner is the greatest in a modification example 2.
Figure 10B:
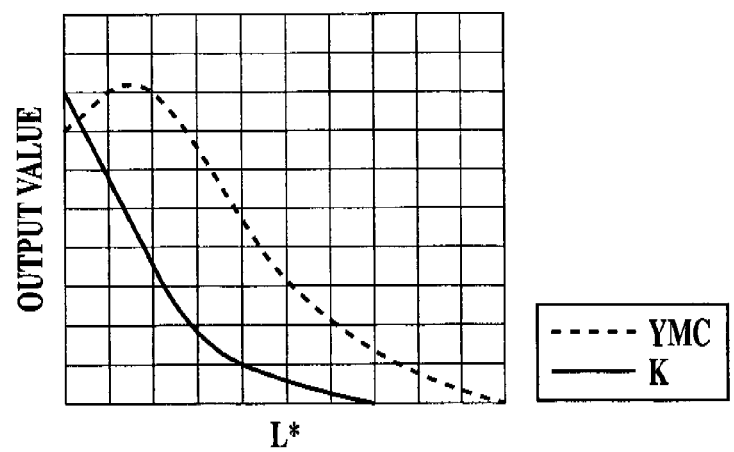
FIG. 10B shows a conversion curve in a case where the maximum adhesion amount of toner is intermediate in the modification example 2.
Figure 10C:
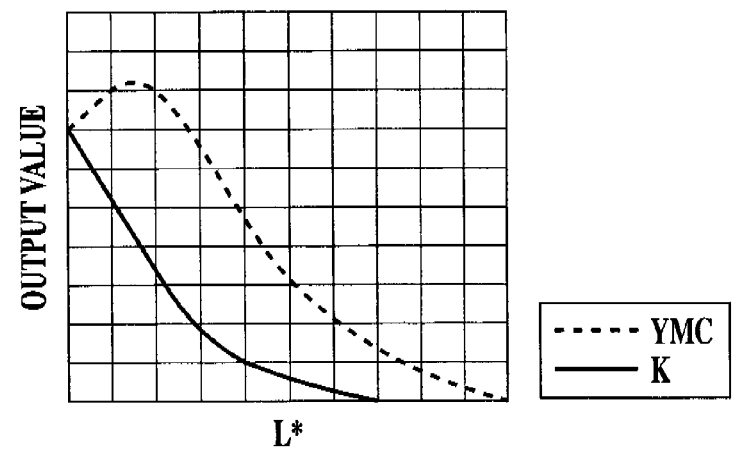
FIG. 10C shows a conversion curve in a case where the maximum adhesion amount of toner is the smallest in the modification example 2.

FIGS. 10A to 10C are examples of conversion curves showing output value (YMCK data) with respect to L* data when a*=0 and b*=0. In FIGS. 10A to 10C, the conversion curve in which L* data is converted to K data (black) is shown in solid line and the conversion curve in which L* data is converted to YMC data (yellow, magenta and cyan) is shown in a dashed line. Among FIGS. 10A to 10C, FIG. 10A is the conversion curve of a case were the upper limit value of image data (YMCK data) after the color conversion process is the greatest and where the maximum adhesion amount of toner is the greatest. Among FIGS. 10A to 10C, FIG. 10B is the conversion curve of a case where the upper limit value of image data after the color conversion process is intermediate and where the maximum adhesion amount of toner is intermediate. Among FIGS. 10A to 10C, FIG. 10C is the conversion curve of a case where the upper limit value of image data after the color conversion process is the smallest and where the maximum adhesion amount of toner is the smallest.

In FIGS. 10A to 10C, the conversion curve in which L* data is converted to YMC data is common. Regarding the conversion curves in which L* data is converted to K data, the output values which are converted from the same L* value gradually decrease in the order of FIG. 10A, FIG. 10B and FIG. 10C. The 3D-LUT 154 is created by deciding conversion curves like FIGS. 10A to 10C for all of a* values and b* values.

Then, the 3D-LUT 153 and the 3D-LUT 154 are combined to create 3D-LUT 152 which converts RGB data to YMCK data.

When the paper feeding tray 41, 42, 43 is selected in the operation unit 11 by an operation by a user or when a selection instruction of the paper feeding tray 41, 42, 43 is received by the communication unit 13, the control unit 10 obtains paper type information indicating size and basis weight of a paper corresponding to the selected paper feeding tray 41, 42 and 43 and whether the paper is coated or not from the paper type information table 151 of the non-volatile memory 15.

By selecting the 3D-LUT 152 to be used for the color conversion process in the color conversion process unit 161 based on the obtained paper type information, the control unit 10 controls so as to change the maximum adhesion amount of toner to the paper. In particular, by setting the maximum adhesion amount of toner of yellow, magenta and cyan at constant and by changing the maximum adhesion amount of black toner, the control unit 10 controls so as to change the maximum adhesion amount of toner to the paper.

In the process of the image forming apparatus in the modification example 2, only the 3D-LUT 152 to be used in the color conversion is different and the other processes are same as the processes shown in FIGS. 6 to 8. Therefore, the description is omitted.

As shown in the modification example 2, when the maximum adhesion amount of toner of yellow, magenta and cyan is set to constant and when the maximum adhesion amount of black toner is changed, noise can be reduced.

[Second Embodiment]

Next, the second embodiment in which the present invention is applied will be described.

The image forming apparatus in the second embodiment has a structure similar to the image forming apparatus 100 shown in the first embodiment. Therefore, FIGS. 1 and 2 are incorporated and referred to here, and drawings and descriptions for the similar structure are omitted. Hereinafter, characteristic structures and processes in the second embodiment will be described.

In the non-volatile memory 15, a plurality of types of 3D-LUT 152 are stored. Further, in the non-volatile memory 15, the threshold T1 of the pixel value and the threshold H1 of the number of pixels to be used in the second image forming apparatus (see FIG. 13) are stored. These values are determined in advance. However, they may be arbitrarily changed.

The 3D-LUT 152 is a look-up table to be used for the color conversion process in which RGB data is converted to YMCK data, and output values (YMCK data) are respectively corresponded to input values (RGB data). Image data to be input is multivalued image data, and for example, when it is image data of 256 tones, each pixel takes tone value of 0 to 255. Hereinafter, the tone value is called pixel value. In the embodiment, two types of 3D-LUT 152 which are formed so that upper limits of image data after color conversion process be different and a standard 3D-LUT 152 are prepared. Here, in the embodiment, a case where RGB data is converted to YMCK data will be described as color conversion process.

However, when YMCK data is inputted to the image forming apparatus via the communication unit 13, 3D-LUT for carrying out color conversion process in which YMCK data is converted to YMCK data should be used.

Here, specific method of creating 3D-LUT 152 will be described with reference to FIG. 4. First, 3D-LUT 153 to convert RGB data to L*a*b* data will be created.

Next, 3D-LUT 154 to convert L*a*b* data to YMCK data is created. In the 3D-LUT 154, GCR process to adjust how much of K data should replace YMC data is also included.

Figure 11A:
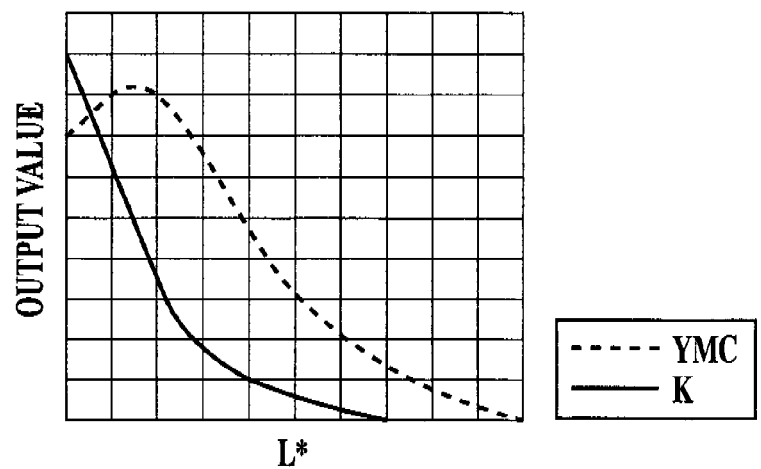
FIG. 11A shows a conversion curve in which an upper limit value of image data after color conversion process is greater.
Figure 11B:
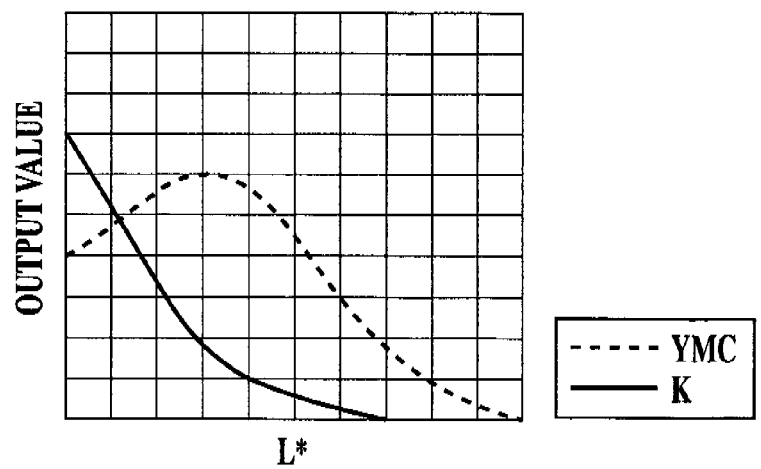
FIG. 11B shows a conversion curve in which the upper limit value of image data after color conversion process is smaller.

FIGS. 11A and 11B are examples of conversion curves showing output values (YMCK data) with respect to L* data when a*=0 and b*=0. In FIGS. 11A and 11B, the conversion curves in which L* data is converted to K data (black) are shown in solid lines and the conversion curves in which L* data is converted to YMC data (yellow, magenta and cyan) are shown in dashed lines. Among FIGS. 11A and 11B, FIG. 11A is the conversion curve of a case where the upper limit value of image data (YMCK data) after the color conversion is greater and where the maximum adhesion amount of toner is greater. Among FIGS. 11A and 11B, FIG. 11B is the conversion curve of a case where the upper limit value of image data after the color conversion is smaller and where the maximum adhesion amount of toner is smaller. Here, a case where a conversion curve is shared for yellow, magenta and cyan and where independent conversion curve is used only for black is exemplified. However, conversion curves may also be formed independently for yellow, magenta and cyan.

Regarding both of the conversion curve in which L* data is converted to K data and the conversion curve in which L* data is converted to YMC data, output value which is converted from the same L* value is smaller in the conversion curve shown in FIG. 11B than in the conversion curve shown in FIG. 11A. Further, L* value which is the peak (part where the output value is the greatest) is greater in the conversion curve in which L* data is converted to YMC data in FIG. 11B comparing to the conversion curve shown in FIG. 11A. By the conversion curves like FIGS. 11A and 11B being decided for all of a* values and b* values, 3D-LUT 154 is created.

Then, finally, the 3D-LUT 153 and the 3D-LUT 154 are combined to create 3D-LUT 152 to convert RGB data to YMCK data.

The control unit 10 makes the color conversion process unit 161 carry out a preparatory color conversion process to the inputted image data by using the standard 3D-LUT 152. The preparatory color conversion process is a process to generate YMCK data which is a determination target when selecting color conversion process condition to be used for an actual conversion process.

Figure 12:
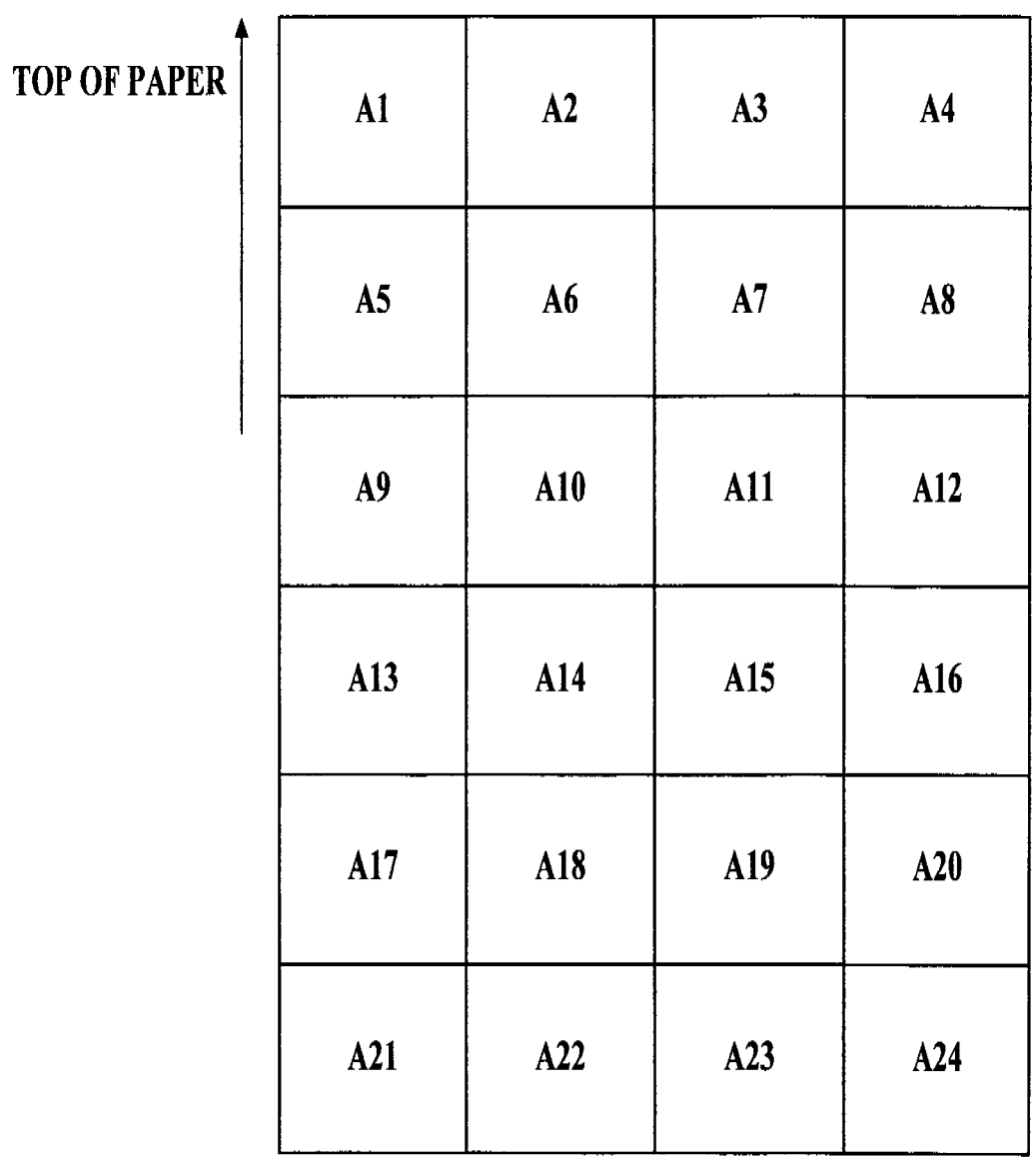
FIG. 12 is a diagram for explaining area division of an image.

The control unit 10 divides the image which is formed by image data after the preparatory color conversion process by the color conversion process 161 in a plurality of areas. For example, the control unit 10 divides the image in a plurality of areas A1 to A24 as shown in FIG. 12.

The control unit 10 obtains the total of pixel values of each color of YMCK for each of the pixels constituting image data in each of the areas, and the control unit 10 determines whether the total is greater than or equal to the predetermined threshold T1 or not.

The control unit 10 detects the number of pixels in which the total of pixel values is greater than or equal to the threshold T1 in each of the areas. Then, the control unit 10 selects color conversion process condition for the color conversion process unit 161 based on the number of pixels in which the total of pixel values is greater than or equal to the threshold T1 in each of the areas. In particular, when an area that the number of pixels in which the total of pixel values is greater than or equal to the threshold T1 is greater than or equal to the threshold H1 exists in the plurality of divided areas, the control unit 10 selects the 3D-LUT 152 in which the upper limit value of image data after the color conversion process is smaller. On the other hand, when the number of pixels in which the total of pixel values is greater than or equal to the threshold T1 is smaller than the threshold H1 in all of the plurality of areas, the control unit 10 selects the 3D-LUT 152 in which the upper limit value of image data after the color conversion process is greater. That is, the control unit 10 selects color conversion process condition that makes pixel value of each pixel that constitutes the image data after the color conversion process by the color conversion process unit 161 be smaller as the number of pixels in which pixel value is greater than or equal to the threshold H1 becomes greater.

The control unit 10 makes the color conversion process unit 161 carry out the actual color conversion process to the inputted image data according to the selected color conversion process condition (3D-LUT 152). The actual color conversion process is the color conversion process which is to be carried out to the inputted image data when an image is actually printed based on the inputted image data. That is, the actual color conversion process is a color conversion process which is carried out to the inputted image data to generate YMCK data to be used in the image forming.

Next, the operation will be described.

Figure 13:
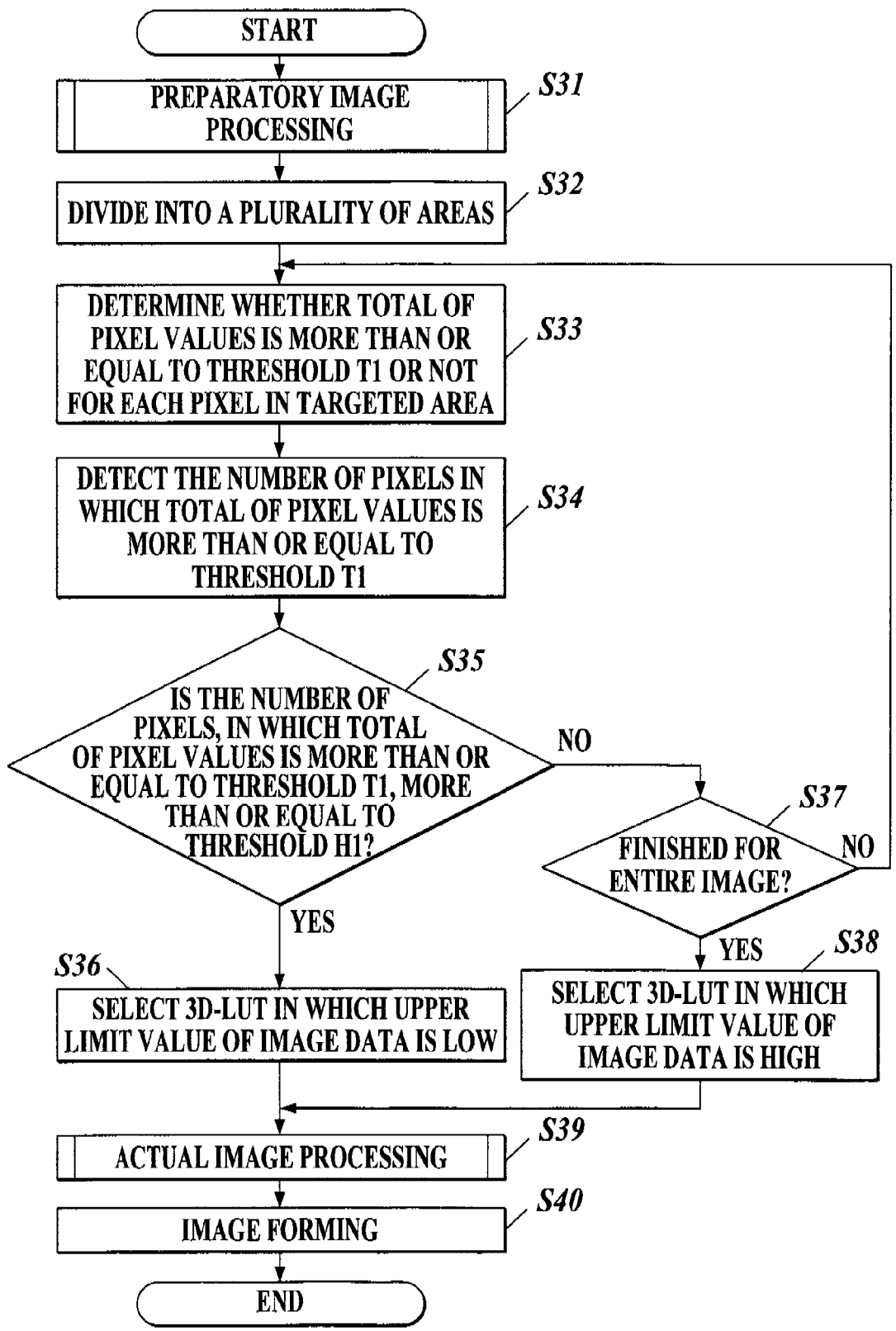
FIG. 13 is a flowchart showing the second image forming process.

FIG. 13 is a flowchart showing the second image forming process which is executed in the image forming apparatus of the second embodiment. This process is realized by a software process in which the CPU of the control unit 10 and programs stored in the storage unit 14 cooperate with one another.

First, the preparatory image processing is carried out by the control unit 10 (step S31). The preparatory image processing is a process to generate YMCK data which becomes determination target when selecting 3D-LUT 152 to be used in the actual color conversion process (see step S54 in FIG. 15) in the actual image processing.

Figure 14:
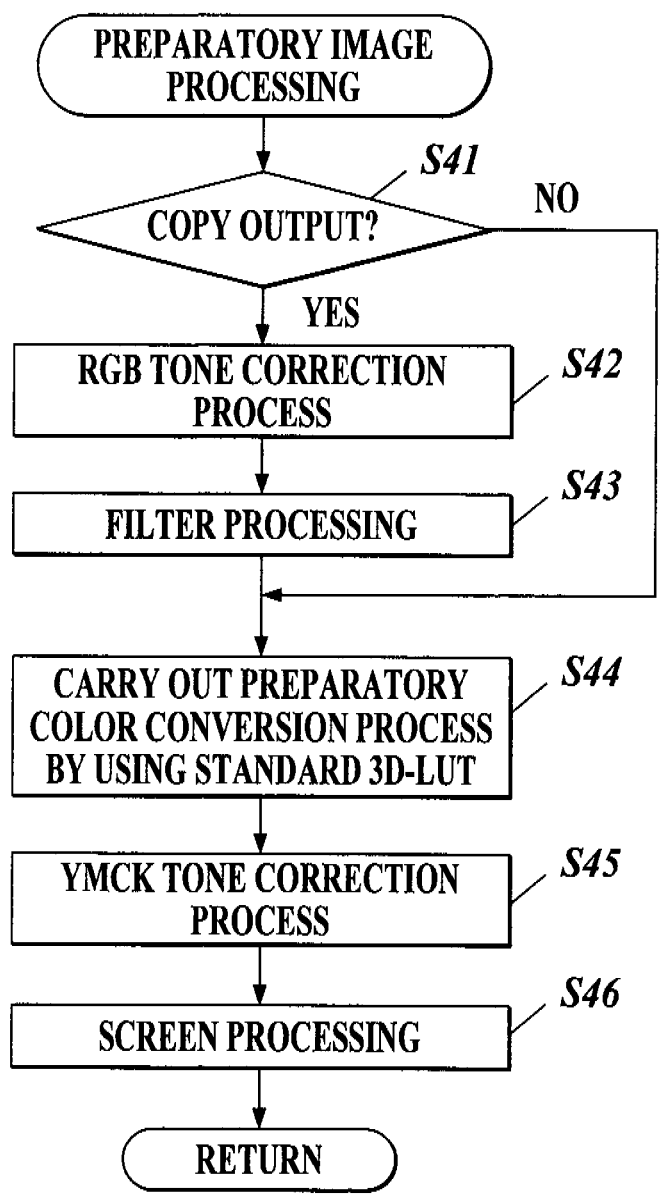
FIG. 14 is a flowchart showing a preparatory image processing.

Here, the preparatory image processing will be described with reference to FIG. 14.

First, the control unit 10 determines whether it is a copy output or not, that is, whether image processing is carried out to the image data which is generated by the image reading unit 20 or whether image processing is carried out to the image data received by the communication unit 13 (step S41).

When it is a copy output (step S41; YES), the RGB tone correction process is carried out to the RGB data which is the image processing target (step S42), and thereafter, a filter processing is carried out (step S43).

In step S41, when it is not a copy output (step S41; NO) or after step S43, the preparatory color conversion process is carried out to the RGB data by using a standard 3D-LUT 152 by the color conversion process unit 161 of the image processing unit 61 according to a control of the control unit 10 (step S44). In particular, the RGB data is converted to YMCK data by the color conversion process unit 161.

Next, the YMCK tone correction process is carried out to the YMCK data by the image processing unit 16 (step S45), and then, a screen processing is carried out (step S46).

Next, returning to FIG. 13, an image formed by the image data after the preparatory image processing which includes the preparatory color conversion process is divided in a plurality of areas by the control unit 10 (see FIG. 12) (step S32).

Next, any one of the plurality of areas is set as a processing target by the control unit 10 and the control unit 10 determines whether the total of pixel values of each color of YMCK is greater than or equal to the threshold T1 or not for each of the pixels in the targeted area or not (step S33).

Next, the number of pixels in which the total of pixel values is greater than or equal to the threshold T1 in the targeted area is detected by the control unit 10 (step S34). Then, whether the number of pixels in which the total of pixel values is greater than or equal to the threshold T1 which is detected in the targeted area is greater than or equal to the threshold H1 or not is determined by the control unit 10 (step S35). When it is determined that the number of pixels in which the total of pixel values is greater than or equal to the threshold T1 is greater than or equal to the threshold H1 in the targeted area (step S35; YES), 3D-LUT 152 in which the upper limit value of image data after the color conversion process is smaller is selected by the control unit 10 (step S36). That is, the 3D-LUT 152 in which the maximum adhesion amount of toner to a paper is smaller is selected by the control unit 10.

In step S35, when the control unit 10 determines that the number of pixels in which total of pixel values is greater than or equal to the threshold T1 in the targeted area is smaller than the threshold H1 (step S35; NO), the control unit 10 determines whether the process for the entire image is finished or not, that is, whether the process for all of the areas is finished or not (step S37). When the control unit 10 determines that the process for the entire image is not finished (step S37; NO), process returns to step S33 and the process is repeated for the next area.

In step S37, when the control unit 10 determines that the process for the entire image is finished (step S37; YES), the control unit 10 selects the 3D-LUT 152 in which the upper limit value of image data after the color conversion process is greater (step S38). That is, the control unit 10 selects the 3D-LUT 152 in which the maximum adhesion amount of toner to a paper is greater.

After step S36 or step S38, the control unit 10 carries out the actual image processing to the image data generated by the image reading unit 20 or to the image data (RGB data) received by the communication unit 13 (step S39).

Figure 15:
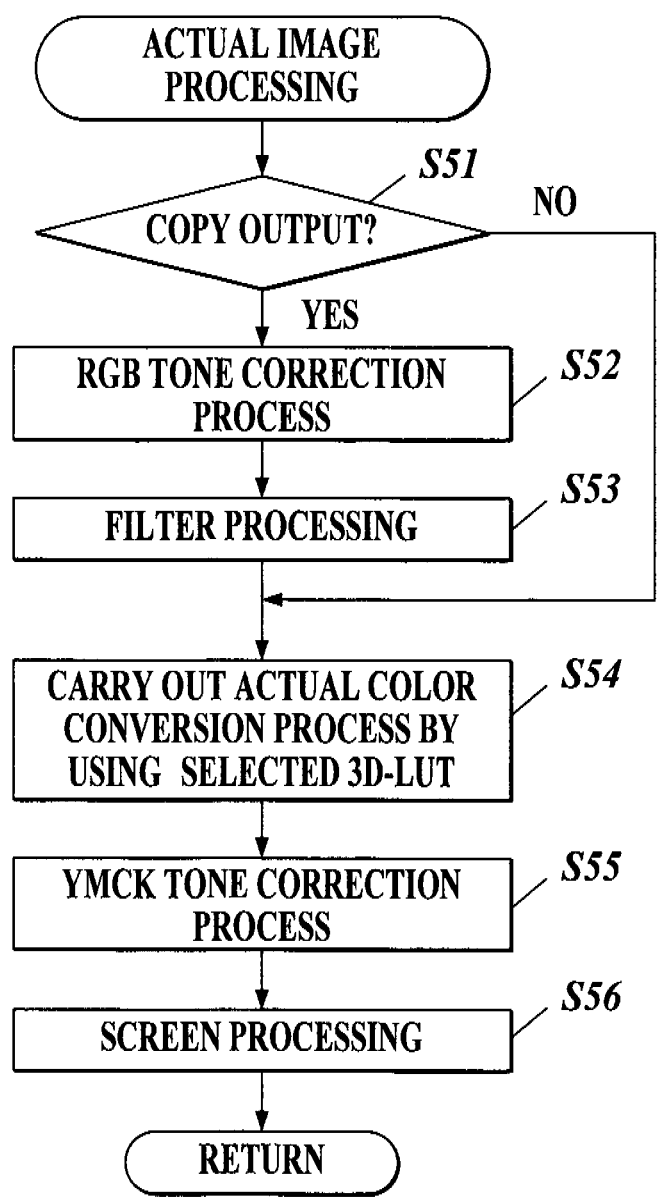
FIG. 15 is a flowchart showing an actual image processing.

Here, the actual image processing will be described with reference to FIG. 15.

First, the control unit 10 determines whether it is a copy output or not, that is, whether image processing is to be carried out to the image data generated by the image reading unit 20 or whether image processing is to be carried out to the image data received by the communication unit 13 (step S51).

When the control unit 10 determines that it is a copy output (step S51; YES), the image processing unit 16 carries out the RGB tone correction process to the RGB data which is an image processing target (step S52), and thereafter, the filter processing is carried out (step S53).

In step S51, when the control unit 10 determines that it is not a copy output (step S51; NO) or after step S53, the color conversion process unit 161 of the image processing unit 16 carries out the actual color conversion process to the RGB data according to a control of the control unit 10 by using the 3D-LUT 152 which is selected in step S36 or step S38 (step S54). In particular, the color conversion process unit 161 converts the RGB data to YMCK data.

Next, the image processing unit 16 carries out the YMCK tone correction process to the YMCK data (step S55), and thereafter, the screen processing is carried out (step S56).

Next, returning to FIG. 13, the image forming unit 30 carries out an image forming to a paper according to a control of the control unit 10 (step S40).

This is the end of the second image forming process.

As described above, according to the image forming apparatus in the second embodiment, the maximum adhesion amount of toner to a paper is changed by selecting the color conversion process condition for the color conversion process unit 161 based on the number of pixels in which total of pixel values is greater than or equal to the threshold T1 in each of the areas. Therefore, color gamut after the color conversion process can be made to be preferably wide while preventing the paper from being wrapped around the intermediate transfer belt 5.

In particular, when an area in which the number of pixels where the total of pixel values is greater than or equal to the threshold T1 is greater than or equal to the threshold H1 exists in the plurality of areas, the image forming apparatus of the second embodiment can select the 3D-LUT 152 in which the upper limit value of image data after the color conversion process is smaller and the maximum adhesion amount of toner can be held down. Therefore, paper can be prevented from being wrapped around the intermediate transfer belt 5.

On the other hand, when an area in which the number of pixels where the total of pixel values is greater than or equal to the threshold T1 is greater than or equal to the threshold H1 does not exist, the image forming apparatus of the second embodiment can select the 3D-LUT 152 in which the upper limit value of image data after the color conversion process is greater and the maximum adhesion amount of toner can be increased. In such case of an image where the paper is not likely to be wrapped around the intermediate transfer belt 5, color gamut after the color conversion process can be made to be preferably wide by increasing the maximum adhesion amount of toner.

[Third Embodiment]

Next, the third embodiment in which the present invention is applied will be described.

The image forming apparatus in the third embodiment has a structure similar to the image forming apparatus 100 shown in the first embodiment. Therefore, FIGS. 1 and 2 are incorporated and referred to here, and drawings and descriptions for the similar structure are omitted. Hereinafter, characteristic structures and processes in the third embodiment will be described.

In the non-volatile memory 15, two types of 3D-LUT 152 which are created so that the upper limit values of image data after the color conversion process be different and a standard 3D-LUT 152 are stored. Further, in the non-volatile memory 15, the thresholds T2, T3 of pixel value and the threshold H2 of the number of pixels which are to be used in the third image forming process (see FIG. 17) are stored. Here, it is assumed that T3 is greater than T2. These values are set in advance. However, the values may be arbitrarily changed.

The control unit 10 makes the color conversion process unit 161 carry out a preparatory color conversion process to inputted image data by using a standard 3D-LUT 152.

Figure 16:
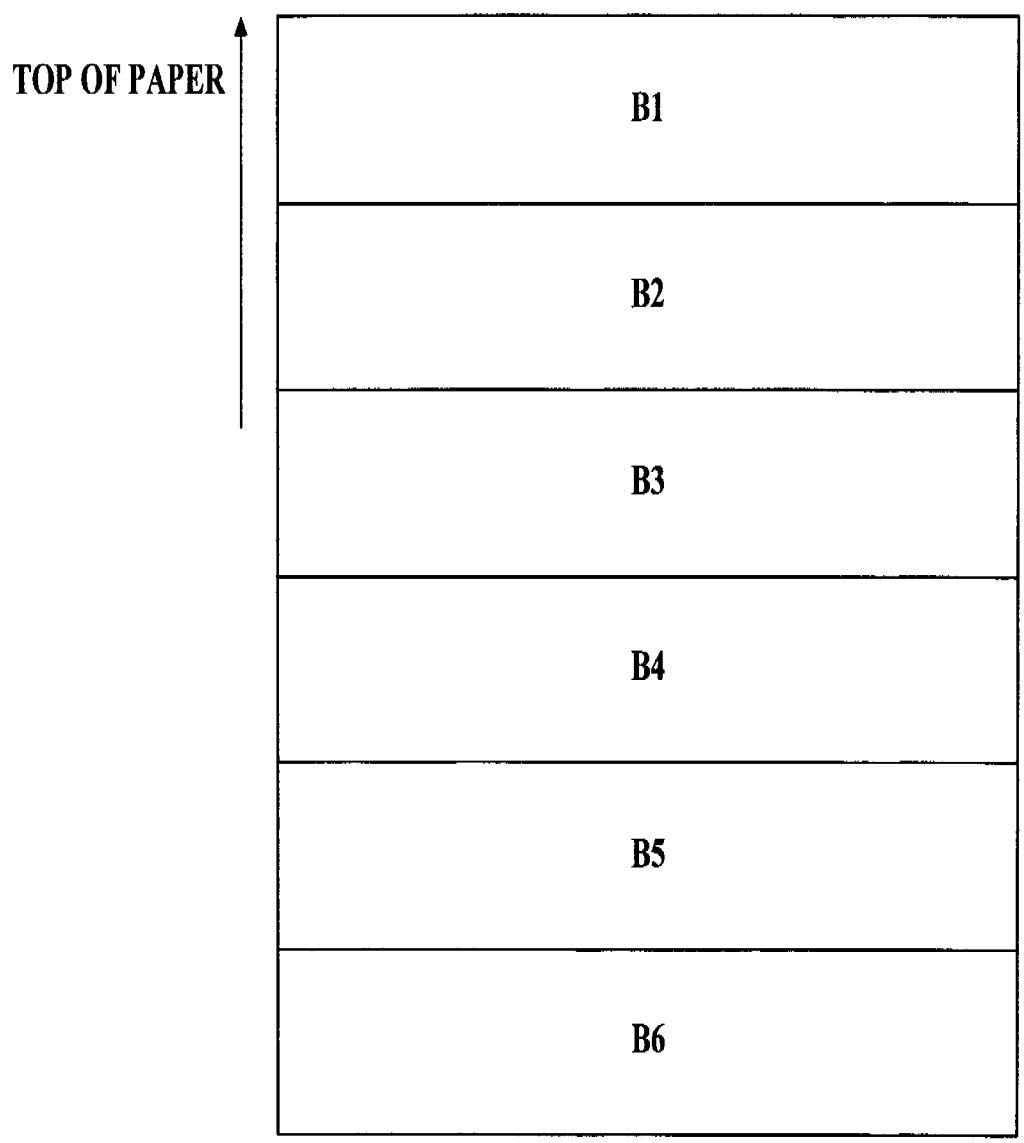
FIG. 16 is a diagram for explaining area division of an image in the third embodiment.

The control unit 10 divides an image which is formed by the image data after the preparatory color conversion process by the color conversion process unit 161 in a plurality of areas along the conveyance direction of the paper. For example, the control unit 10 divides the image into a plurality of areas B1 to B6 as shown in FIG. 16.

The control unit 10 obtains the total of pixel values of each color of YMCK for each pixel which constitutes the image data in the area corresponding to the top of the paper (area B of FIG. 16) among the plurality of areas and determines whether the total is greater than or equal to the predetermined threshold T2 or not. The control unit 10 detects the number of pixels in which the total of pixel values is greater than or equal to the threshold T2 in the area corresponding to the top of the paper. Thereafter, the control unit 10 selects color conversion process condition for the color conversion process unit 161 based on the number of pixels in which the total of pixel values is greater than or equal to the threshold T2 in the area corresponding to the top of the paper.

Further, the control unit 10 obtains the total of pixel values of each color of YMCK for each pixel which constitutes the image data in the areas excluding the area corresponding to the top of the paper (areas B2 to B6 of FIG. 16) among the plurality of areas and determines whether the total is greater than or equal to the predetermined threshold T3 or not. The control unit 10 detects the number of pixels in which the total of pixel values is greater than or equal to the threshold T3 in the areas. Thereafter, the control unit 10 selects color conversion process condition for the color conversion process unit 161 based on the number of pixels in which the total of pixel values is greater than or equal to the threshold T3 in the areas.

In particular, when the number of pixels in which the total of pixel values is greater than or equal to the threshold T2 is greater than of equal to the threshold H2 in the area corresponding to the top of the paper (area B1 of FIG. 16), the control unit 10 selected the 3D-LUT 152 in which the upper limit value of image data after the color conversion process is smaller. Further, when an area in which the number of pixels in which the total of pixel values is greater than or equal to the threshold T3 is greater than or equal to the threshold H2 exists in the areas excluding the area corresponding to the top of the paper (areas B2 to B6 of FIG. 16), the control unit 10 selects the 3D-LUT 152 in which the upper limit value of image data after the color conversion process is smaller. Further, when the number of pixels in which the total of pixel values is greater than or equal to the threshold T2 in the area corresponding to the top of the paper (area B1 of FIG. 16) is smaller than the threshold H2 and when the number of pixels in which the total of pixel values is greater than or equal to the threshold T3 is smaller than the threshold H2 in any of the areas excluding the area corresponding to the top of the paper (areas B2 to B6 of FIG. 16), the control unit 10 selects the 3D-LUT 152 in which the upper limit value of image data after the color conversion process is greater.

The control unit 10 makes the color conversion process unit 161 carry out the actual color conversion process to the inputted image data according to the selected color conversion process condition (3D-LUT 152).

Next, the operation will be described.

Figure 17:
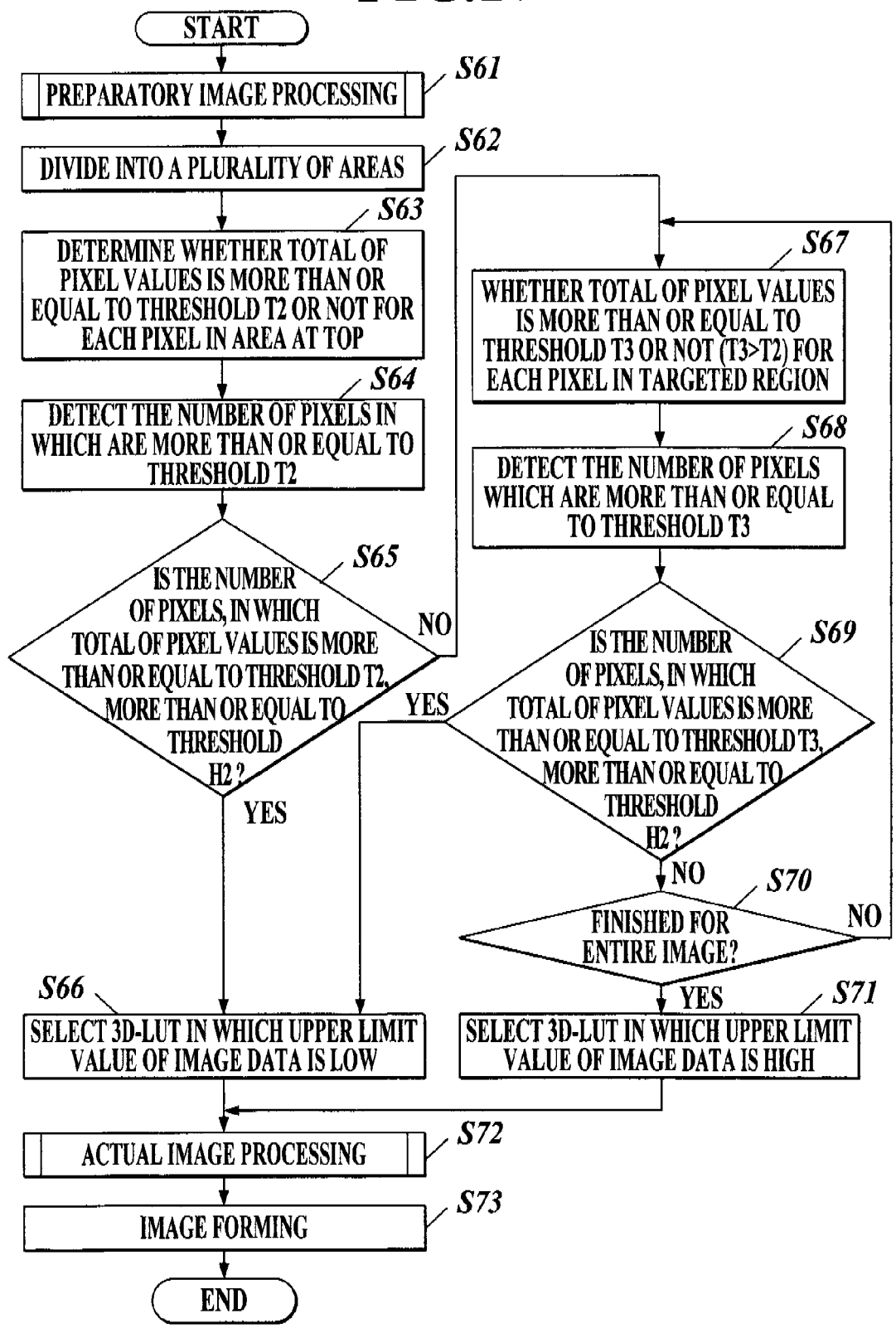
FIG. 17 is a flowchart showing the third image forming process.

FIG. 17 is a flowchart showing the third image forming process which is executed in the image processing apparatus of the third embodiment. The process is realized by a software process where the CPU of the control unit 10 and the programs stored in the storage unit 14 cooperate with one another.

First, the control unit 10 carries out the preparatory image processing (step S61). The preparatory image processing is similar to the preparatory image processing (see FIG. 14) in the second embodiment. Therefore, the description is omitted.

Next, the control unit 10 divides an image which is formed by the image data after the preparatory image processing which includes the preparatory color conversion process in a plurality of areas along the conveyance direction of the paper (see FIG. 16) (step S62).

Next, the control unit 10 determines whether the total of pixel values of each color of YMCK is greater than or equal to the threshold T2 or not for each pixel which constitutes the image data in the area corresponding to the top of the paper among the plurality of areas (step S63).

Next, the control unit 10 detects the number of pixels in which the total of pixel values is greater than or equal to the threshold T2 in the area corresponding to the top of the paper (step S64). Then, the control unit 10 determines whether the number of pixels in which the total of pixel values is greater than or equal to the threshold T2 which are detected in the area corresponding to the top of the paper is greater than or equal to the threshold H2 or not (step S65). When the control unit 10 determines that the number of pixels in which the total of pixel values is greater than or equal to the threshold T2 in the area corresponding to the top of the paper is greater than or equal to the threshold H2 (step S65; YES), the control unit 10 selects the 3D-LUT 152 in which the upper limit value of image data after the color conversion process is smaller (step S66). That is, the control unit 10 selects the 3D-LUT 152 in which the maximum adhesion amount of toner to a paper is smaller.

In step S65, when the number of pixels in which the total of pixel values is greater than or equal to the threshold T2 in the area corresponding to the top of the paper is smaller than the threshold H2 (step S65; NO), the control unit 10 sets any one of the areas excluding the area corresponding to the top of the paper as the processing target, and the control unit 10 determines whether the total of pixel values of each color of YMCK is greater than or equal to the threshold T3 or not for each pixel in the targeted area (step S67).

Next, the control unit 10 detects the number of pixels in which the total of pixel values is greater than or equal to the threshold T3 in the targeted area (step S68). Then, the control unit 10 determines whether the number of pixels in which the total of pixel values is greater than or equal to the threshold T3 detected in the targeted are is greater than or equal to the threshold H2 or not (step S69). When the control unit 10 determines that the number of pixels in which the total of pixel values is greater than or equal to the threshold T3 in the targeted area is greater than or equal to the threshold H2 (step S69; YES), the control unit 10 selects the 3D-LUT 152 in which the upper limit value of image data after the color conversion process is smaller (step S66). That is, the control unit 10 selects the 3D-LUT 152 in which the maximum adhesion amount to toner to a paper is smaller.

In step S69, when the control unit 10 determines that the number of pixels in which the total of pixel values is greater than or equal to the threshold T3 in the targeted area is smaller than the threshold H2 (step S69; NO), the control unit 10 determines whether the process for the entire image is finished or not, that is, whether the process for all of the areas is finished or not (step S70). When the control unit 10 determines that the process for the entire image is not finished (step S70; NO), the process returns to step S67 and the process is repeated for the next area.

In step S70, when the control unit 10 determines that the process for the entire image is finished (step S70; YES), the control unit 10 selects the 3D-LUT 152 in which the upper limit value of image data after the color conversion process is greater (step S71). That is, the control unit 10 selects the 3D-LUT 152 in which the maximum adhesion amount of toner to a paper is greater.

After step S66 or step 71, the control unit 10 carries out the actual image processing to the image data which is generated by the image reading unit 20 or the image data (RGB data) which is received by the communication unit 13 (step S72). The actual image processing is similar to the actual image processing (see FIG. 15) in the second embodiment. Therefore, the description is omitted.

Next, the image forming unit 30 carries out an image forming to a paper according to a control of the control unit 10 (step S73).

This is the end of the third image forming process.

As described above, according to the image forming apparatus of the third embodiment, the maximum adhesion amount of toner to a paper is changed by selecting the color conversion process condition in the color conversion process unit 161 based on the number of pixels in which the total of pixel values is greater than or equal to the threshold T2 in the area corresponding to the top of the paper and the number of pixels in which the total of pixel values is greater than the threshold T3 in the other areas. Therefore, color gamut after the color conversion process can be made to be preferably wide while preventing the paper from being wrapped around the intermediate transfer belt 5.

Further, according to the image forming apparatus of the third embodiment, the thresholds T2 and T3 for determining the contrasting density of the image can be changed according to the likeliness of occurrence of wrapping around in each area. In particular, for the area which is likely to cause wrapping around (the area corresponding to the top of the paper), the thresholds can be made to be smaller comparing to other areas.

Here, in the third embodiment, the explanation is given for a case where the thresholds T2 and T3 are different in the area corresponding to the top of the paper and the other areas. However, the thresholds can be made to be greater gradually as being away from the top of the paper. Further, instead of changing the thresholds T2 and T3, the threshold H2 which is used when determining the number of pixels in which the pixel value is greater than or equal to the predetermined threshold can be changed for each area.

[Fourth Embodiment]

Next, the fourth embodiment in which the present invention is applied will be described.

The image forming apparatus in the fourth embodiment has a structure similar to the image forming apparatus 100 shown in the first embodiment. Therefore, FIGS. 1 and 2 are incorporated and referred to here, and drawings and descriptions for the similar structure are omitted. Hereinafter, characteristic structures and processes in the fourth embodiment will be described.

In the non-volatile memory 15, two types of 3D-LUT 152 which are created so that the upper limit values of image data after the color conversion process be different and a standard 3D-LUT 152 are stored. Further, the threshold H3 of the number of pixels which is to be used in the fourth image forming process (see FIG. 19) is also stored in the non-volatile memory 15. The value is determined in advance. However, the value may be arbitrarily changed.

The control unit 10 makes the color conversion process unit 161 carry out a preparatory color conversion process to inputted image data by using the standard 3D-LUT 152.

The control unit 10 divides an image which is formed by the image data after the preparatory color conversion process by the color conversion process unit 161 in a plurality of areas. For example, the control unit 10 divides the image in the plurality of areas of A1 to A24 as shown in FIG. 12.

The control unit 10 determines whether color of a pixel fulfills the predetermined condition (hereinafter, called the determination condition) or not for each pixel constituting the image data in each area. The determination condition is for determining the contrasting density of color, that is, to determine the adhesion amount of toner.

Here, with reference to FIG. 18, a description will be given to a case where weightings to the determination condition are different according to colors of YMC. Here, in order to make the description simple, it is assumed that black (K) component does not exist. The likeliness of causing the wrapping may differ according to type (color) of toner. For example, even when it is a secondary color (color in which two colors of YMC are mixed), coming off of toner occurs easily in blue which is constituted with magenta and cyan than in red which is constituted with yellow and magenta or green which is constituted with cyan and yellow. As reasons why contribution to the occurrence of wrapping is different according to color, differences in ingredients of toners, differences in the order the colors are layered and the like are suggested.

Figure 18:
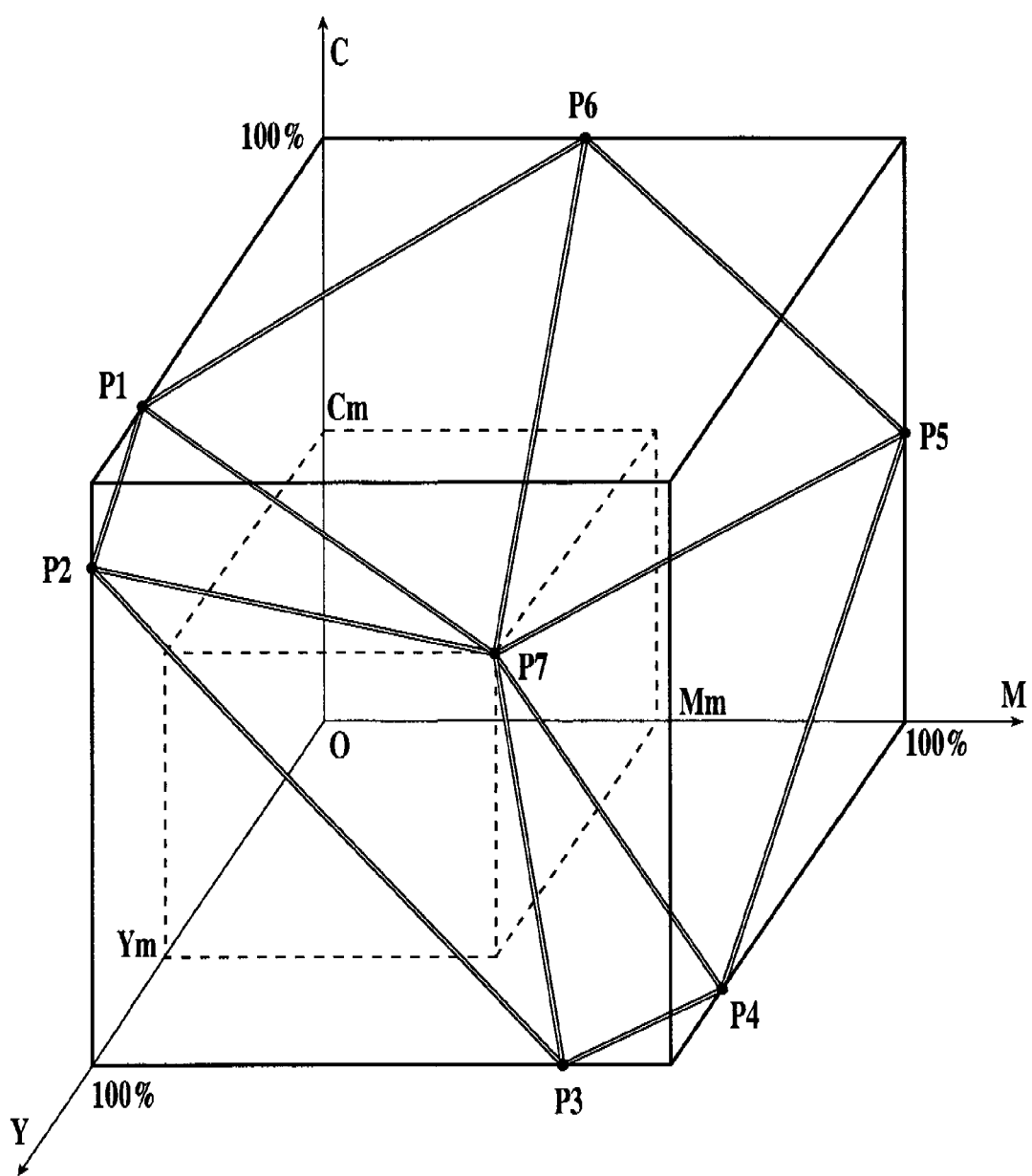
FIG. 18 is a diagram for explaining a determination condition in the fourth embodiment.

As shown in FIG. 18, O (0, 0, 0), P1 (Y1, 0, 100), P2 (100, 0, C2), P3 (100, M3, 0), P4 (Y4, 100, 0), P5 (0, 100, C5), P6 (0, M6, 100) and P7 (Ym, Mm, Cm) are set in the three dimensional space of YMC. The unit is [%] for each axis of YMC. The line segment which connects point P1 and point P2 shows a border whether the wrapping occurs in CY plane or not. The line segment which connects point P3 and point P4 shows a border whether the wrapping occurs in YM plane or not. The line segment which connects point P5 and point P6 shows a border whether the wrapping occurs in MC plane or not. FIG. 18 is an example of a case where Y1=C2, M3=Y4 and C5=M6. However, values of Y1, M3 and C5 are respectively different. Further, point P7 shows a border whether the wrapping occurs in the third color of YMC (color in which three colors of YMC are mixed) or not. There are cases where the point P7 is closer than the plane which passes the points P1 to P6 when seeing from the origin O and where the point P7 is further than the plane. The points P1 to P7 are determined in advance by experiment.

By setting each of the triangle in which points P1, P2 and P7 are apexes, the triangle in which points P2, P3 and P7 are apexes, the triangle in which points P3, P4 and P7 are apexes, the triangle in which points P4, P5 and P7 are apexes, the triangle in which points P5, P6 and P7 are apexes, the triangle in which points P6, P1 and P7 are apexes (portions shown in double lines in FIG. 18) as border plane, when a color which is the determination target is on the border plane or outside (further position) of the border plane when seeing from the origin O, the determination condition is fulfilled.

The control unit 10 detects the number of pixels which fulfill the determination condition in each area. Then, the control unit 10 selects color conversion process condition for the color conversion process unit 161 based on the number of pixels which fulfill the determination condition. In particular, when an area in which the number of pixels which fulfill the determination condition is greater than or equal to the threshold H3 exists in the plurality of divided areas, the control unit 10 selects the 3D-LUT 152 in which the upper limit value of image data after the color conversion process is smaller. On the other hand, when the number of pixels which fulfill the determination condition is smaller than the threshold H3 in any of the plurality or areas, the control unit 10 selects the 3D-LUT 152 in which the upper limit value of image data after the color conversion process is greater.

The control unit 10 makes the color conversion process unit 161 carry out the actual color conversion process to the inputted image data according to the selected color conversion process condition (3D-LUT 152).

Next, the operation will be described.

Figure 19:
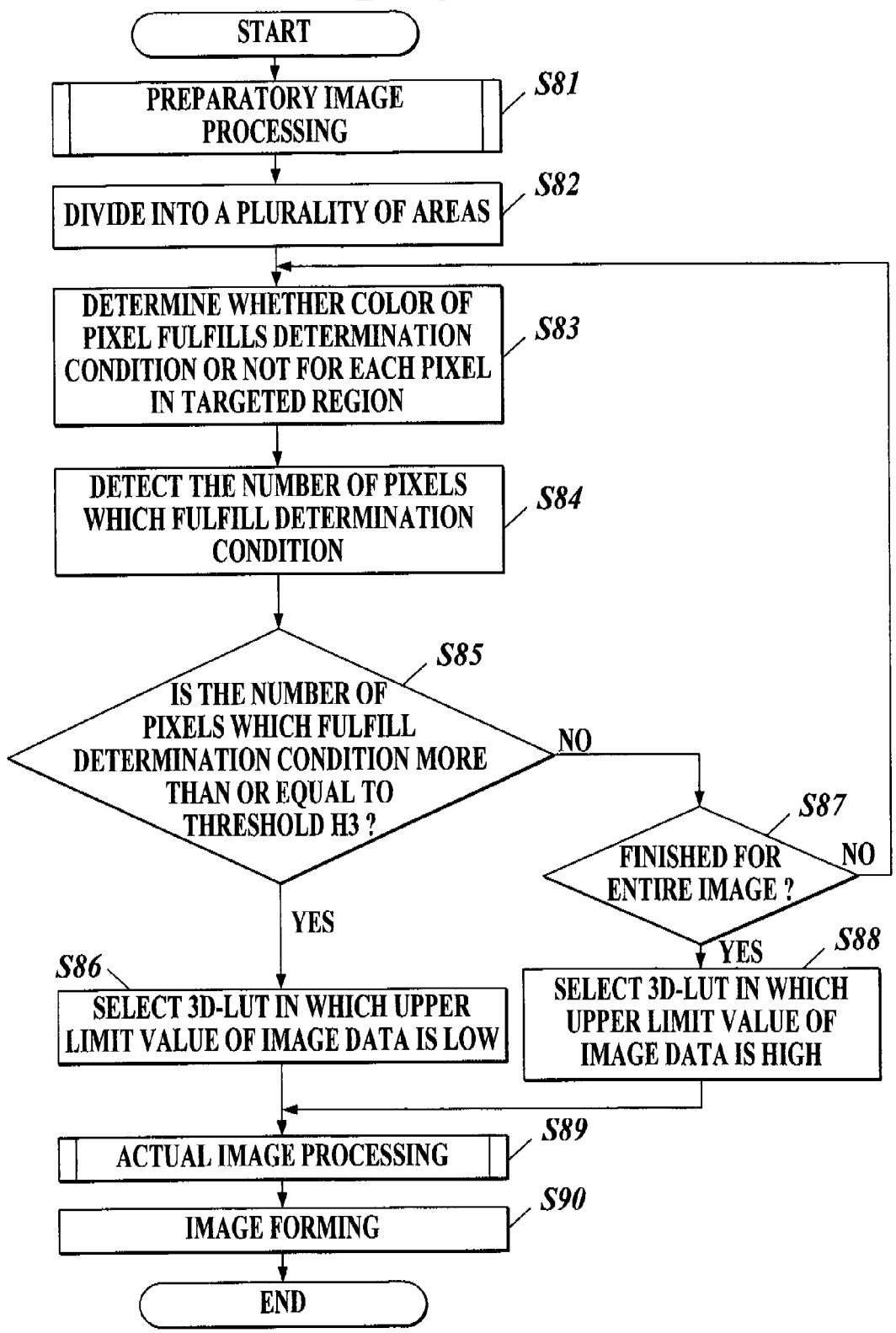
FIG. 19 is a flowchart showing the fourth image forming process.

FIG. 19 is a flowchart showing the fourth image forming process which is executed in the image forming apparatus of the fourth embodiment. The process is realized by a software process where the CPU of the control unit 10 and the programs stored in the storage unit 14 cooperate with one another.

First, the control unit 10 carries out the preparatory image processing (step S81). The preparatory image processing is similar to the preparatory image processing (see FIG. 14) in the second embodiment. Therefore, the description is omitted.

Next, the control unit 10 divides an image which is formed by the image data after the preparatory image processing which includes the preparatory color conversion process in a plurality of areas (see FIG. 12) (step S82).

Next, the control unit 10 sets any one of the plurality of areas as a processing target, and the control unit 10 determines whether the color of pixel fulfill the determination condition or not for each pixel in the targeted area (step S83).

Next, the control unit 10 detects the number of pixels which fulfill the determination condition in the targeted area (step S84). Then, the control unit 10 determines whether the number of pixels which fulfill the determination condition which are detected in the targeted area is greater than or equal to the threshold H3 or not (step S85). When the number of pixels which fulfill the determination condition in the targeted area is greater than or equal to the threshold H3 (step S85; YES), the control unit 10 selects the 3D-LUT 152 in which the upper limit value of image data after the color conversion process is smaller (step S86). That is, the control unit 10 selects the 3D-LUT 152 in which the maximum adhesion amount of toner to a paper is smaller.

In step S85, when the number of pixels which fulfill the determination condition in the targeted area is smaller than the threshold H3 (step S85; NO), the control unit 10 determines whether the process for the entire image is finished or not, that is, whether the process for all of the areas is finished or not (step S87). When the control unit 10 determines that the process for the entire image is not finished (step S87; NO), the process returns to step S83, and the process is repeated for the next area.

In step S87, when the control unit 10 determines that the process for the entire image is finished (step S87; YES), the control unit 10 selects the 3D-LUT 152 in which the upper limit value of image data after the color conversion process is greater (step S88). That is, the control unit 10 selects the 3D-LUT 152 in which the maximum adhesion amount of toner to a paper is greater.

After step S86 or step S88, the control unit 10 carries out the actual image processing to the image data which is generated by the image reading unit 20 or the image data (RGB data) which is received by the communication unit 13 (step S89). The actual image processing is similar to the actual image processing (see FIG. 15) in the second embodiment. Therefore, the description is omitted.

Next, the image forming unit 30 carries out an image forming to a paper according to a control of the control unit 10 (step S90).

This is the end of the fourth image forming process.

As described above, according to the image forming apparatus of the fourth embodiment, the maximum adhesion amount of toner to a paper is changed by selecting the color conversion process condition for the color conversion processing unit 161 based on the number of pixels which fulfill the determination condition in each area. Therefore, color gamut after the color conversion process can be made to be preferably wide while preventing the paper from being wrapped around the intermediate transfer belt 5.

In particular, when an area in which the number of pixels which fulfill the determination condition is greater than or equal to the threshold H3 exists in the plurality of areas, the image forming apparatus selects the 3D-LUT 152 in which the upper limit value of image data after the color conversion process is smaller and the maximum adhesion amount of toner can be held down. Therefore, the paper can be prevented from being wrapped around the intermediate transfer belt 5.

On the other hand, when an area in which the number of pixels which fulfill the determination condition is greater than or equal to the threshold H3 does not exit, the image forming apparatus selects the 3D-LUT 152 in which the upper limit value of image data after the color conversion process is greater and the maximum adhesion amount of toner can be increased. In such case of an image in which the paper is not likely to be wrapped around the intermediate transfer belt 5, color gamut after the color conversion process can be made to be preferably wide by increasing the maximum adhesion amount of toner.

Here, in the fourth embodiment, the description is given for a case where weighting to the determination condition differs according to the color of YMC as shown in FIG. 18. However, as shown in FIG. 20, the weighting of YMC to the determination condition may be same.

Figure 20:
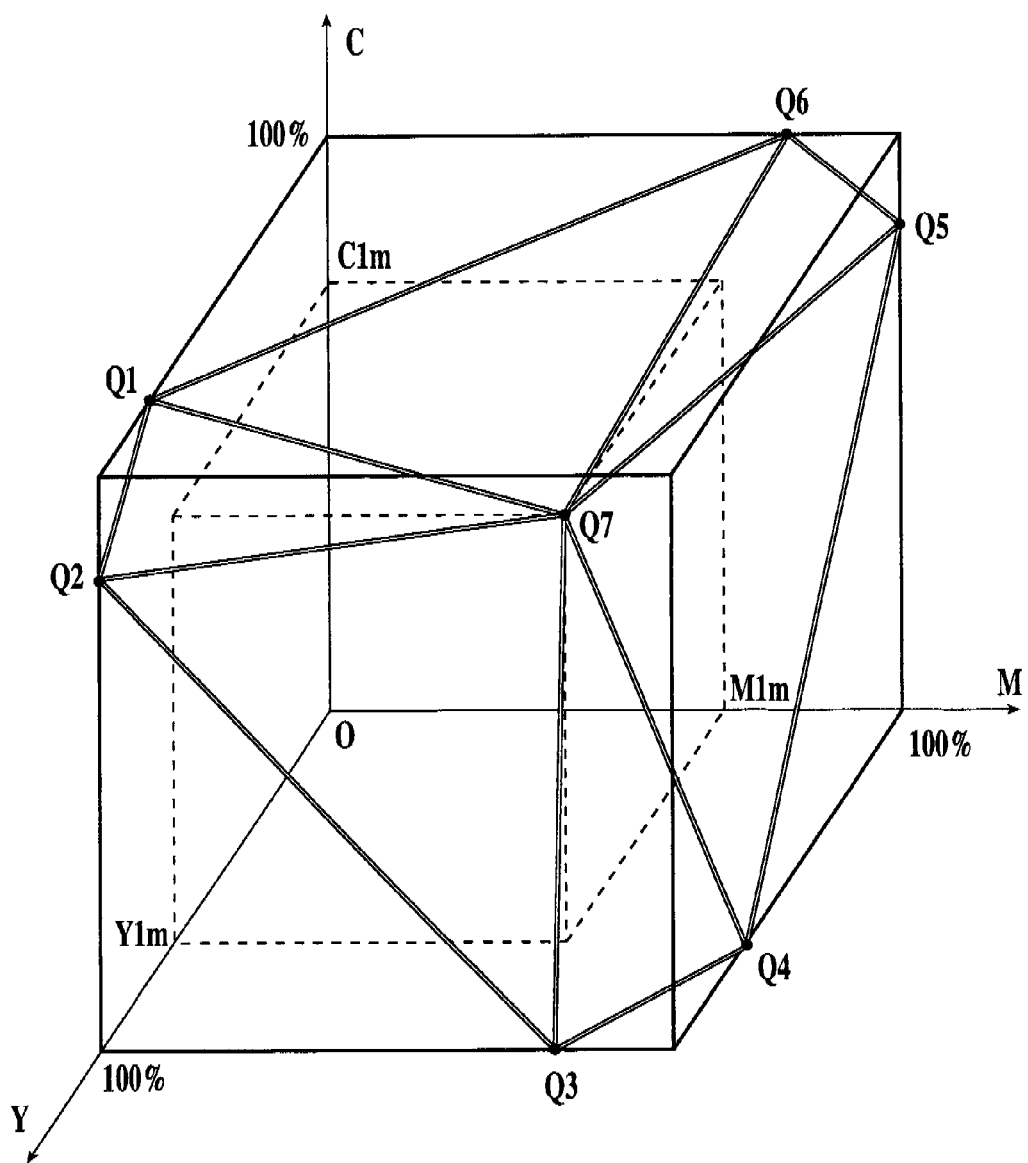
FIG. 20 is an example of a case where weighting of YMC with respect of the determination condition is the same.

In particular, as shown in FIG. 20, O (0, 0, 0), Q1 (Y11, 0, 100), Q2 (100, 0, C12), Q3 (100, M13, 0), Q4 (Y14, 100, 0), Q5 (0, 100, C15), Q6 (0, M16, 100) and Q7 (Y1$m$, M1$m$, C1$m$) are set in the three dimensional space of YMC. For each axis of YMC, the unit is [%]. The line segment which connects point Q1 and point Q2 shows a border whether the wrapping occurs in CY plane or not. The line segment which connects point Q3 and point Q4 shows a border whether the wrapping occurs in YM plane or not. The line segment which connects point Q5 and point Q6 shows a border whether the wrapping occurs in MC plane or not. FIG. 20 is an example of a case where Y11=C12=M13=Y14=C15=M16. Further, point Q7 shows a border whether the wrapping occurs in the third color of YMC or not. There are cases where the point Q7 is closer than the plane which passes the points Q1 to Q6 when seeing from the origin O and where the point Q7 is further than the plane. The points Q1 to Q7 are determined in advance by experiment.

In the example shown in FIG. 20, by setting each of the triangle in which points Q1, Q2 and Q7 are apexes, the triangle in which points Q2, Q3 and Q7 are apexes, the triangle in which points Q3, Q4 and Q7 are apexes, the triangle in which points Q4, Q5 and Q7 are apexes, the triangle in which points Q5, Q6 and Q7 are apexes and the triangle in which points Q6, Q1 and Q7 are apexes (portions shown in double lines in FIG. 20) as border planes, it is assumed that the color which is the determination target fulfills the determination condition when the color is on the border plane or is outside (further position) than the border plane when seeing form the origin O.

Moreover, in the second to fourth embodiments, descriptions are given to the cases where any one of the two types of 3D-LUT 152 is selected to be used in the actual color conversion process. However, three types or more of the 3D-LUT in which the upper limit values of image data after the color conversion process are different may be prepared, and any one of the 3D-LUT may be selected from the three types or more of the 3D-LUT.

Further, as for the image data which is used when selecting the 3D-LUT 152, an image after thinning of pixels is carried out can be used. In such case, the processing can be speeded up.

MODIFICATION EXAMPLE 3

Next, the modification example 3 as a modification example of the second to fourth embodiments will be described.

The modification example 3 is an example of a case where the maximum adhesion amount of toner to a paper is changed by setting the maximum adhesion amount of black toner to a constant and by changing the maximum adhesion amount of toner of yellow, magenta and cyan.

In the modification example 3, only the 3D-LUT 152 which is used for the color conversion process is different and the other structures and processes are similar to the second to fourth embodiments. Therefore, description for the other structures and processes are omitted.

First, method of creating 3D-LUT 152 in the modification example 3 will be described. First, 3D-LUT 153 which converts RGB data to L*a*b* data is created.

Next, 3D-LUT 154 which converts the L*a*b* data to YMCK data is created. The 3D-LUT 154 includes GCR process.

Figure 21A:
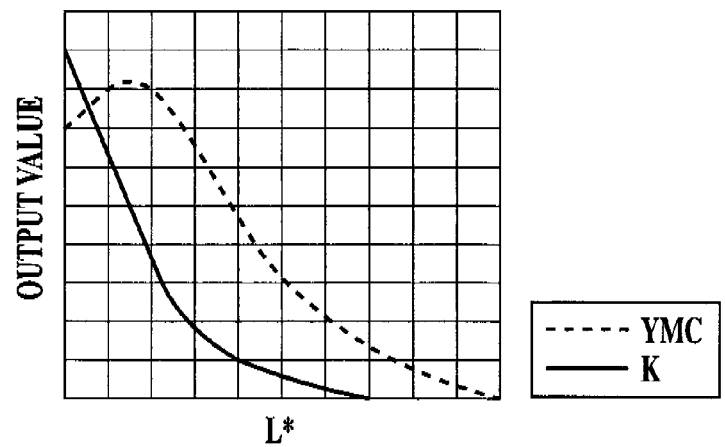
FIG. 21A shows a conversion curve in which the upper limit value of image data after color conversion is greater in a modification example 3.
Figure 21B:
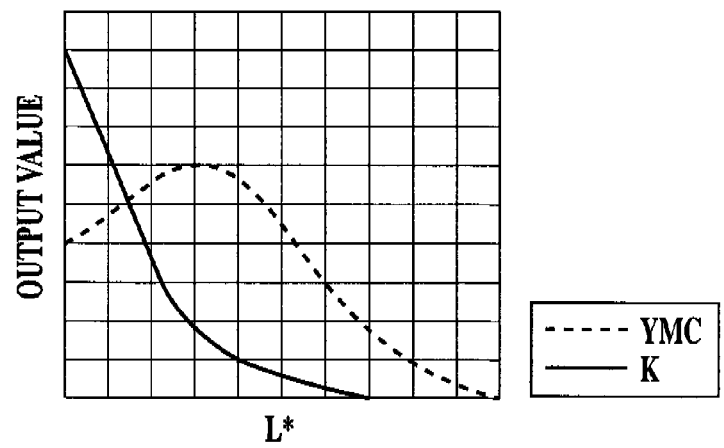
FIG. 21B shows a conversion curve in which the upper limit value of image data after color conversion is smaller in the modification example 3.

FIGS. 21A and 21B are examples of conversion curves showing output values (YMCK data) with respect to L* data when a*=0 and b*=0. In FIGS. 21A and 21B, the conversion curves in which the L* data is converted to K data (black) are shown in solid lines and the conversion curves in which the L* data is converted to YMC data (yellow, magenta, cyan) are shown in dashed lines. Among FIGS. 21A and 21B, FIG. 21A is the conversion curve of a case where the upper limit value of image data (YMCK data) after the color conversion process is greater and where the maximum adhesion amount of toner is greater. Among FIGS. 21A and 21B, FIG. 21B is the conversion curve of a case where the upper limit value of image data after the color conversion process is smaller and where the maximum adhesion amount of toner is smaller.

The conversion curve in which L* data is converted to K data is common in FIGS. 21A and 21B. As for the conversion curves in which L* data is converted to YMC data, the output value which is converted from the same L* value is smaller in the conversion curve shown in FIG. 21B than the conversion curve shown in FIG. 21A. Further, the L* value which becomes the peak (portion where the output value is greatest) is greater in the conversion curve of FIG. 21B in which L* data is converted to YMC data comparing to the conversion curve shown in FIG. 21A. The 3D-LUT 154 is created by deciding the conversion curves such as FIGS. 21A and 21B in all of a* values and b* values.

Furthermore, by combining the 3D-LUT 153 and the 3D-LUT 154, the 3D-LUT 152 for converting RGB data to YMCK data is created.

As shown in the modification example 3, when the maximum adhesion amount of black toner is set to a constant and when the maximum adhesion amount of toner of yellow, magenta and cyan is changed, gray balance can be stable because there is no change in black.

MODIFICATION EXAMPLE 4

Next, the modification example 4 as a modification example of the second to fourth embodiments will be described.

The modification example 4 is an example of a case where the maximum adhesion amount of toner to a paper is changed by setting the maximum adhesion amount of toner of yellow, magenta and cyan to a constant and by changing the maximum adhesion amount of back toner.

In the modification example 4, only the 3D-LUT 152 which is used for the color conversion process is different and the other structures and processes are similar to the second to fourth embodiments. Therefore, descriptions for the other structures and processes are omitted.

First, method of creating 3D-LUT 152 in the modification example 4 will be described. First, 3D-LUT 153 which converts RGB data to L*a*b* data is created.

Next, 3D-LUT 154 which converts the L*a*b* data to YMCK data is created. The 3D-LUT 154 includes GCR process.

Figure 22A:
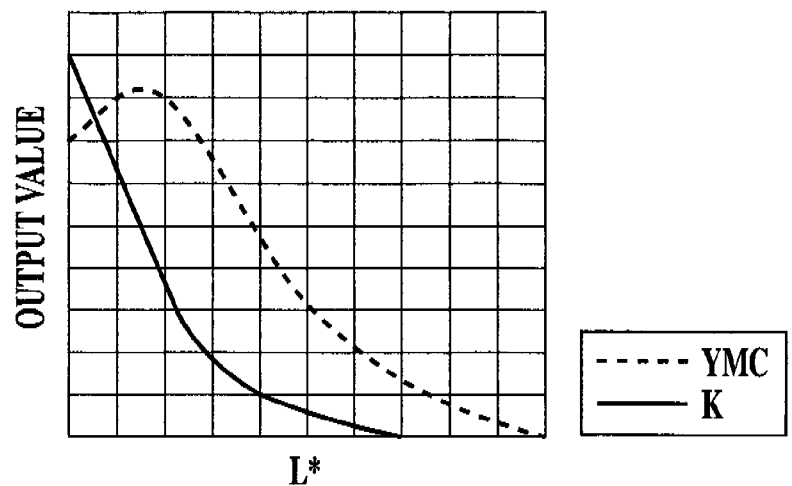
FIG. 22A shows a conversion curve in which the upper limit value of image data after color conversion is greater in a modification example 4.
Figure 22B:
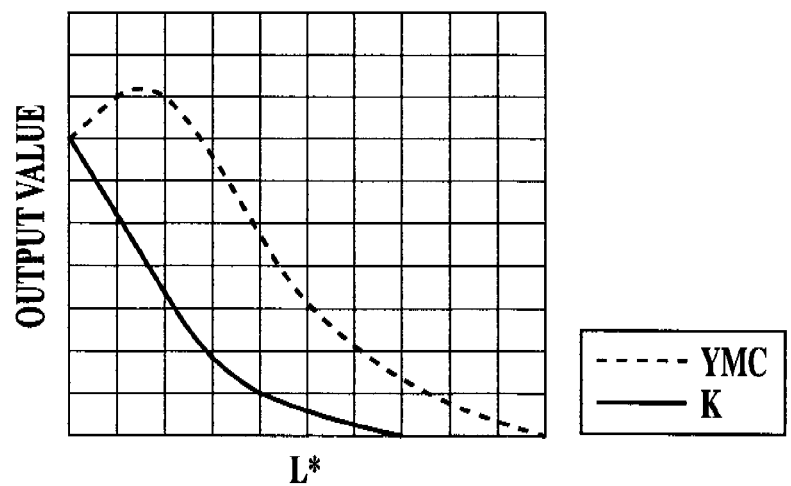
FIG. 22B shows a conversion curve in which the upper limit value of image data after color conversion is smaller in the modification example 4.

FIGS. 22A and 22B are examples of conversion curves showing output values (YMCK data) with respect to L* data when a*=0 and b*=0. In FIGS. 22A and 22B, the conversion curves in which L* data is converted to K data (black) are shown in solid lines and the conversion curves in which L* data is converted to YMC data (yellow, magenta and cyan) are shown in dashed lines. Among FIGS. 22A and 22B, FIG. 22A is the conversion curve of a case where the upper limit value of image data (YMCK data) after the color conversion process is greater and where the maximum adhesion amount of toner is greater. Among FIGS. 22A and 22B, FIG. 22B is the conversion curve of a case where the upper limit value of image data after the color conversion process is smaller and where the maximum adhesion amount of toner is smaller.

The conversion curve in which L* data is converted to YMC data is common FIGS. 22A and 22B. As for the conversion curves in which L* data is converted to K data, the output value which is converted from the same L* value is smaller in the conversion curve shown in FIG. 22B than the conversion curve shown in FIG. 22A. The 3D-LUT 154 is created by deciding the conversion curves such as FIGS. 22A and 22B in all of a* values and b* values.

Furthermore, by combining the 3D-LUT 153 and the 3D-LUT 154, 3D-LUT 152 for converting RGB data to YMCK data is created.

As shown in the modification example 4, when the maximum adhesion amount of toner of yellow, magenta and cyan is set to a constant and when the maximum adhesion amount of black toner is changed, noise can be reduced.

Here, the descriptions of the above each embodiment and modification example are examples of the image forming apparatus of the present invention, and the present invention is not limited to the descriptions. The detailed structures and detailed operations of the apparatus can be arbitrarily modified.

For example, each of the above embodiments are examples of cases where an image carrier which supports a toner image before being transferred to a paper is the intermediate transfer belt 5, and the object is to prevent the paper from being wrapped around to the intermediate transfer belt 5. However, in a case of an image forming apparatus in which the toner image is transferred directly to a paper from the photoconductor drum, the paper can be prevented from being wrapped around the photoconductor drum.

In the above description, an example where a storage device such as a hard disk is used as a computer readable medium in which programs for executing each process are stored is disclosed, however, it is not limited to this example. As other computer readable medium, a non-volatile memory such as a flash memory and the like, a transportable recording medium such as a CD-ROM and the like may be applied. Further, as a medium to provide program data via a communication circuit, a carrier wave may be applied.

According to one aspect of a preferred embodiment of the present invention, there is provided an image forming apparatus comprising an image forming unit which forms a toner image on an image carrier and transfers the formed toner image on a paper, a color conversion process unit to carry out a color conversion process to convert inputted image data to image data of an output color in the image forming unit, a paper type information obtaining unit to obtain at least one or more information among a size of a paper, a basis weight of the paper and whether the paper is coated or not and a control unit to control so as to change a maximum adhesion amount of a toner to a paper by selecting a color conversion process condition for the color conversion process unit based on the information obtained by the paper type information obtaining unit.

In the image forming apparatus, color gamut after the color conversion process can be made to be preferably wide while preventing the paper from being wrapped around the image carrier.

Preferably, a selecting of the color conversion process condition for the color conversion process unit by the control unit is a selecting of a three dimensional look-up table to be used in the color conversion process in the color conversion process unit.

In the image forming apparatus, color gamut after the color conversion process can be made to be preferably wide while preventing the paper from being wrapped around the image carrier by selecting the three dimensional look up table.

Preferably, the output color in the image forming unit includes yellow, magenta, cyan and black, and the control unit controls so as to change the maximum adhesion amount of the toner to the paper by setting a maximum adhesion amount of a black toner to a constant and by changing a maximum adhesion amount of a toner of yellow, a magenta and cyan.

In the image forming apparatus, gray balance can be stable because the maximum adhesion amount of black toner is set to be constant.

Preferably, the output color in the image forming unit includes yellow, magenta, cyan and black, and the control unit controls so as to change the maximum adhesion amount of the toner to the paper by setting a maximum adhesion amount of a toner of yellow, magenta and cyan to a constant and by changing a maximum adhesion amount of a black toner.

In the image forming apparatus, noise can be reduced.

Further, according to another aspect of a preferred embodiment of the present invention, there is provided an image forming apparatus comprising an image forming unit which forms a toner image on an image carrier and transfers the formed toner image on a paper, a color conversion process unit to carry out a color conversion process to convert inputted image data to image data of an output color in the image forming unit and a control unit to make the color conversion process unit carry out a preparatory color conversion process to the inputted image data, to determine whether a pixel value of each pixel constituting image data after the preparatory color conversion process is greater than or equal to a threshold which is predetermined or not, to detect the number of pixels in which the pixel value is greater than or equal to the threshold, to select a color conversion process condition for the color conversion process unit based on the detected number of pixels in which the pixel value is greater than or equal to the threshold, and to make the color conversion process unit carry out an actual color conversion process to the inputted image data according to the selected color conversion process condition.

In the image forming apparatus, color gamut after the color conversion process can be made to be preferably wide while preventing the paper from being wrapped around the image carrier.

Preferably, the control unit selects the color conversion process condition which makes the pixel value of each pixel constituting the image data after the color conversion process by the color conversion process unit be small as the number of pixels in which the pixel value is greater than or equal to the threshold is greater.

In the image forming apparatus, when the number of pixels in which the pixel value is greater than or equal to the threshold is large, the color conversion process condition which makes the pixel value of each pixel smaller can be selected.

Preferably, the threshold is different for each of areas which are made by dividing an image generated by the image data after the color conversion process by the color conversion process unit in a plurality of areas.

In the image forming apparatus, the threshold can be changed according to likeliness of causing the wrapping.

Preferably, the threshold is smaller in an area corresponding to a top of the paper among the plurality of areas comparing to other areas.

In the image forming apparatus, the threshold can be made small for the area which is likely to cause the wrapping.

Preferably, a selecting of the color conversion process condition for the color conversion process unit by the control unit is a selecting of a three dimensional look-up table to be used in the color conversion process in the color conversion process unit.

In the image forming apparatus, color gamut after the color conversion process can be made to be preferably wide while preventing the paper from being wrapped around the image carrier by selecting the three dimensional look up table.

Preferably, the output color in the image forming unit includes yellow, magenta, cyan and black, and the control unit selects the color conversion process condition for the color conversion process unit so as to set a maximum adhesion amount of a black toner to a constant and so as to change a maximum adhesion amount of a toner of yellow, magenta and cyan.

In the image forming apparatus, gray balance can be stable because the maximum adhesion amount of black toner is set to be constant.

Preferably, the output color in the image forming unit includes yellow, magenta, cyan and black, and the control unit selects the color conversion process condition for the color conversion process unit so as to set a maximum adhesion amount of a toner of yellow, magenta and cyan to a constant and so as to change a maximum adhesion amount of a black toner.

In the image forming apparatus, noise can be reduced.

Further, according to another aspect of a preferred embodiment of the present invention, there is provided an image forming apparatus comprising an image forming unit which forms a toner image on an image carrier and transfers the formed toner image on a paper, a color conversion process unit to carry out a color conversion process to convert inputted image data to image data of an output color in the image forming unit and a control unit to make the color conversion process unit carry out a preparatory color conversion process to the inputted image data, to determine whether a color of each pixel constituting image data after the preparatory color conversion process fulfills a determination condition which is predetermined or not, to detect the number of pixels which fulfill the determination condition, to select a color conversion process condition for the color conversion process unit based on the detected number of pixels which fulfill the determination condition, and to make the color conversion process unit carry out an actual color conversion process to the inputted image data according to the selected color conversion process condition.

In the image forming apparatus, color gamut after the color conversion process can be made to be preferably wide while preventing the paper from being wrapped around the image carrier.

Preferably, a selecting of the color conversion process condition for the color conversion process unit by the control unit is a selecting of a three dimensional look-up table to be used in the color conversion process in the color conversion process unit.

In the image forming apparatus, color gamut after the color conversion process can be made to be preferably wide while preventing the paper from being wrapped around the image carrier by selecting the three dimensional look up table.

Preferably, the output color in the image forming unit includes yellow, magenta, cyan and black, and the control unit selects the color conversion process condition for the color conversion process unit so as to set a maximum adhesion amount of a black toner to a constant and so as to change a maximum adhesion amount a toner yellow, magenta and cyan.

In the image forming apparatus, gray balance can be stable because the maximum adhesion amount of black toner is set to be constant.

Preferably, the output color in the image forming unit includes yellow, magenta, cyan and black, and the control unit selects the color conversion process condition for the color conversion process unit so as to set a maximum adhesion amount of a toner of yellow, magenta and cyan to a constant and so as to change a maximum adhesion amount of a toner of black.

In the image forming apparatus, noise can be reduced.

The entire disclosure of Japanese Patent Application No. 2009-020081 filed on Jan. 30, 2009 in the Japanese Patent Office and Japanese Patent Application No. 2009-076549 filed on Mar. 26, 2009 in the Japanese Patent Office are incorporated herein by reference in its entirety.

What is claimed is:

1. An image forming apparatus, comprising:
   an image forming unit which forms a toner image on an image carrier and transfers the formed toner image on a paper;
   a color conversion process unit to carry out a color conversion process to convert inputted image data to image data of an output color in the image forming unit;
   a paper type information obtaining unit to obtain at least one or more information among a size of a paper, a basis weight of the paper and whether the paper is coated or not; and
   a control unit to control so as to change a maximum adhesion amount of a toner to a paper by selecting a color conversion process condition for the color conversion process unit based on the information obtained by the paper type information obtaining unit.

2. The image forming apparatus of claim 1, wherein
   a selecting of the color conversion process condition for the color conversion process unit by the control unit is a selecting of a three dimensional look-up table to be used in the color conversion process in the color conversion process unit.

3. The image forming apparatus of claim 1, wherein
   the output color in the image forming unit includes yellow, magenta, cyan and black, and
   the control unit controls so as to change the maximum adhesion amount of the toner to the paper by setting a maximum adhesion amount of a black toner to a constant and by changing a maximum adhesion amount of a toner of yellow, a magenta and cyan.

4. The image forming apparatus of claim 1, wherein
   the output color in the image forming unit includes yellow, magenta, cyan and black, and
   the control unit controls so as to change the maximum adhesion amount of the toner to the paper by setting a maximum adhesion amount of a toner of yellow, magenta and cyan to a constant and by changing a maximum adhesion amount of a black toner.

* * * * *